United States Patent
Kidamura et al.

(10) Patent No.: US 10,263,743 B2
(45) Date of Patent: Apr. 16, 2019

(54) VIDEO-PROCESSING APPARATUS, VIDEO-PROCESSING SYSTEM, AND VIDEO-PROCESSING METHOD

(71) Applicant: PFU LIMITED, Ishikawa (JP)

(72) Inventors: Takashi Kidamura, Ishikawa (JP); Takashi Oki, Kanagawa (JP)

(73) Assignee: PFU LIMITED, Ishikawa (JP)

( * ) Notice: Subject to any disclaimer, the term of this patent is extended or adjusted under 35 U.S.C. 154(b) by 323 days.

(21) Appl. No.: 15/057,275

(22) Filed: Mar. 1, 2016

(65) Prior Publication Data

US 2017/0141891 A1    May 18, 2017

(30) Foreign Application Priority Data

Nov. 16, 2015 (JP) ................. 2015-224180

(51) Int. Cl.
*H04L 5/00* (2006.01)
*H04N 21/236* (2011.01)
(Continued)

(52) U.S. Cl.
CPC ..... *H04L 5/0044* (2013.01); *H04N 21/23605* (2013.01); *H04N 21/4343* (2013.01); *H04N 21/2381* (2013.01); *H04N 21/4363* (2013.01)

(58) Field of Classification Search
CPC .. H04L 5/0044; H04N 21/234; H04N 21/236; H04N 21/23605; H04N 21/2381; H04N 21/434; H04N 21/4343; H04N 21/4363
See application file for complete search history.

(56) References Cited

U.S. PATENT DOCUMENTS

| | | | |
|---|---|---|---|
| 7,333,489 B1* | 2/2008 | Nelson | H04L 49/90 370/392 |
| 2001/0009547 A1* | 7/2001 | Jinzaki | H04L 12/40058 370/390 |

(Continued)

FOREIGN PATENT DOCUMENTS

| | | |
|---|---|---|
| JP | 07-298257 A | 11/1995 |
| JP | 2000-209557 A | 7/2000 |

(Continued)

OTHER PUBLICATIONS

Office Action issued in corresponding Japanese Patent Application No. 2015-224180, dated Jan. 4, 2017.

(Continued)

*Primary Examiner* — James R Sheleheda
(74) *Attorney, Agent, or Firm* — McDermott Will & Emery LLP

(57) ABSTRACT

The present disclosure receives a frame where an identification data packet of a predetermined standard that identifies the frame from a head of the frame by a predetermined period is arranged via a network, writes the identification data packet, a video data packet, and an ancillary data packet in a buffer having a predetermined size so that the identification data packet is arranged at a head of the buffer, reads the identification data packet, the video data packet, and the ancillary data packet from the head of the buffer, converts the video data packet into video data and converts the ancillary data packet into ancillary data, multiplexes the video data and the ancillary data, and outputs video/ancillary data.

14 Claims, 15 Drawing Sheets

(51) Int. Cl.
  *H04N 21/434* (2011.01)
  *H04N 21/2381* (2011.01)
  *H04N 21/4363* (2011.01)

(56) References Cited

U.S. PATENT DOCUMENTS

| | | | | |
|---|---|---|---|---|
| 2001/0026326 | A1* | 10/2001 | Itaki | G06F 3/1446 348/383 |
| 2005/0200763 | A1* | 9/2005 | Matsubayashi | G06F 17/30802 348/700 |
| 2008/0199154 | A1* | 8/2008 | Kanai | G11B 27/105 386/330 |
| 2008/0310630 | A1 | 12/2008 | Candelore | |
| 2009/0106807 | A1* | 4/2009 | Suzuki | H04N 21/23424 725/114 |
| 2009/0161017 | A1 | 6/2009 | Glen | |
| 2009/0178090 | A1* | 7/2009 | Oztaskent | H04N 7/17336 725/90 |
| 2009/0288125 | A1* | 11/2009 | Morioka | H04N 7/1675 725/110 |
| 2011/0022684 | A1* | 1/2011 | Nakao | H04L 67/06 709/219 |
| 2011/0037904 | A1 | 2/2011 | Yokokawa et al. | |
| 2011/0247033 | A1 | 10/2011 | Okada et al. | |
| 2011/0304739 | A1* | 12/2011 | Itakura | H04N 5/23203 348/211.1 |
| 2012/0201310 | A1 | 8/2012 | Yamagishi et al. | |
| 2013/0014193 | A1* | 1/2013 | Emura | H04N 21/242 725/114 |
| 2013/0258147 | A1 | 10/2013 | Kachi | |
| 2014/0140794 | A1* | 5/2014 | Adachi | B65G 1/04 414/277 |
| 2015/0312598 | A1* | 10/2015 | Itakura | H04N 21/236 725/117 |
| 2016/0088321 | A1 | 3/2016 | Tsukagoshi | |
| 2016/0227131 | A1* | 8/2016 | Itakura | H04N 21/236 |
| 2016/0299868 | A1* | 10/2016 | Lavoie | G06F 13/4081 |
| 2017/0070772 | A1* | 3/2017 | Nakamura | H04N 21/4383 |
| 2017/0111285 | A1* | 4/2017 | Lim | H04N 19/44 |
| 2017/0141891 | A1* | 5/2017 | Kidamura | H04L 5/0044 |
| 2017/0208258 | A1* | 7/2017 | Itakura | H04N 21/236 |
| 2017/0303009 | A1* | 10/2017 | Nakamura | H04N 21/23602 |

FOREIGN PATENT DOCUMENTS

| | | |
|---|---|---|
| JP | 2001-045034 A | 2/2001 |
| JP | 2001-045477 A | 2/2001 |
| JP | 2001-237893 A | 8/2001 |
| JP | 2006-080919 A | 3/2006 |
| JP | 2007-074127 A | 3/2007 |
| JP | 2008-187258 A | 8/2008 |
| JP | 2009-100265 A | 5/2009 |
| JP | 2010-028574 A | 2/2010 |
| JP | 2010-531562 A | 9/2010 |
| JP | 2010-245638 A | 10/2010 |
| JP | 2011-041098 A | 2/2011 |
| JP | 2011-216928 A | 10/2011 |
| JP | 2012-004768 A | 1/2012 |
| JP | 2012-070344 A | 4/2012 |
| JP | 2013-211645 A | 10/2013 |
| JP | 2014-239508 A | 12/2014 |
| JP | 2015-012557 A | 1/2015 |
| WO | 2010/087129 A1 | 8/2010 |
| WO | 2011/048829 A1 | 4/2011 |
| WO | 2011/105250 A1 | 9/2011 |
| WO | 2014/203871 A1 | 12/2014 |

OTHER PUBLICATIONS

Decision to Grant issued in corresponding Japanese Patent Application No. 2015-224180, dated Sep. 19, 2017.

Office Action issued in corresponding Japanese Patent Application No. 2015-224180, dated Mar. 28, 2017.

* cited by examiner

VIDEO-PROCESSING APPARATUS, VIDEO-PROCESSING SYSTEM, AND VIDEO-PROCESSING METHOD

CROSS-REFERENCE TO RELATED APPLICATION

This application is based upon and claims the benefit of priority from Japanese Patent Application No. 2015-224180, filed on Nov. 16, 2015, the entire contents of which are incorporated herein by reference.

BACKGROUND OF THE INVENTION

1. Field of the Invention

The present disclosure relates to a video-processing apparatus, a video-processing system, and a video-processing method.

2. Description of the Related Art

Conventionally, techniques of outputting image data photographed by a camera to a display or the like at a remote site by transmitting and receiving compressed or uncompressed video data via a network have been disclosed.

Herein, disclosed is a technique of preventing a problem of disturbance of an image at the time of video channel switching by burying discrimination data by which a position of inter-frame compression or intra-frame compression in compressed video data can be discriminated and allowing a compressed video data reception side to detect and identify the discrimination data (refer to JP-A-7-298257).

Disclosed is a technique of preventing a problem of disturbance of an image at the time of video channel switching by detecting a GOP header indicating a position where inter-frame compression in the compressed video data is performed and performing a video channel switch operation in units of the GOP header (refer to JP-A-2001-45477).

Disclosed is a technique of preventing collapse of blocks of an image at the time of video channel switching by performing the video channel (transport stream) switching by using a payload start indicator in the transport stream of MPEG image data (refer to JP-A-2000-209557).

However, the conventional apparatus (JP-A-7-298257 or the like) in the related art has a problem in that head data of the frame cannot be detected without de-encapsulation.

SUMMARY OF THE INVENTION

It is an object of the present disclosure to at least partially solve the problems in the conventional technology.

A video-processing apparatus according to one aspect of the present disclosure includes a network frame receiving unit that receives, via a network, a frame including a video data packet of a predetermined standard, an ancillary data packet of the predetermined standard, and an identification data packet of the predetermined standard that identifies the frame and is arranged by a predetermined period from a head of the frame, a packet writing unit that writes the identification data packet, the video data packet, and the ancillary data packet in a buffer having a predetermined size so that the identification data packet is arranged at a head of the buffer, a packet reading unit that reads the identification data packet, the video data packet, and the ancillary data packet from the head of the buffer, a data converting unit that converts the video data packet into video data and converts the ancillary data packet into ancillary data, and a video ancillary data multiplexing unit that multiplexes the video data and the ancillary data and outputs video/ancillary data.

A video-processing apparatus according to another aspect of the present disclosure includes a video ancillary data separating unit that acquires video/ancillary data from a photographing device and separates the video/ancillary data into video data and ancillary data, a packetizing unit that packetizes the video data into a video data packet of a predetermined standard and packetizes the ancillary data into an ancillary data packet of the predetermined standard, a packet arranging unit that arranges an identification data packet of the predetermined standard that identifies a frame from a head of the frame by a predetermined period and arranges the video data packet and the ancillary data packet, a packet writing unit that writes the identification data packet, the video data packet, and the ancillary data packet in a buffer having a predetermined size so that the identification data packet is arranged at a head of the buffer, a packet reading unit that reads the identification data packet, the video data packet, and the ancillary data packet from the head of the buffer, and a network frame transmitting unit that transmits the frame where the identification data packet is arranged by the predetermined period from the head of the frame and that includes the video data packet and the ancillary data packet via the network.

A video-processing system according to still another aspect of the present disclosure includes a transmitting device and a receiving device that are communicably connected, wherein the transmitting device includes a video ancillary data separating unit that acquires video/ancillary data from a photographing device and separates the video/ancillary data into video data and ancillary data, a packetizing unit that packetizes the video data into a video data packet of a predetermined standard and packetizes the ancillary data into an ancillary data packet of the predetermined standard, a packet arranging unit that arranges an identification data packet of the predetermined standard that identifies a frame from a head of the frame by a predetermined period and arranges the video data packet and the ancillary data packet, a packet writing unit that writes the identification data packet, the video data packet, and the ancillary data packet in a buffer of a transmission side having a predetermined size so that the identification data packet is arranged at a head of the buffer of the transmission side, a packet reading unit that reads the identification data packet, the video data packet, and the ancillary data packet from the head of the buffer of the transmission side, and a network frame transmitting unit that transmits the frame where the identification data packet is arranged by the predetermined period from the head of the frame and that includes the video data packet and the ancillary data packet via the network, and wherein the receiving device includes a network frame receiving unit that receives the frame via the network, a packet writing unit that writes the identification data packet, the video data packet, and the ancillary data packet in a buffer of a reception side having the predetermined size so that the identification data packet is arranged at a head of the buffer of the reception side, a packet reading unit that reads the identification data packet, the video data packet, and the ancillary data packet from the head of the buffer of the reception side, a data converting unit that converts the video data packet into the video data and converts the ancillary data packet into the ancillary data, and a video ancillary data multiplexing unit that multiplexes the video data and the ancillary data and outputs the video/ancillary data.

A video-processing method according to still another aspect of the present disclosure includes a network frame receiving step of receiving, via a network, a frame including a video data packet of a predetermined standard, an ancillary data packet of the predetermined standard, and an identification data packet of the predetermined standard that identifies the frame and is arranged by a predetermined period from a head of the frame, a packet writing step of writing the identification data packet, the video data packet, and the ancillary data packet in a buffer having a predetermined size so that the identification data packet is arranged at a head of the buffer, a packet reading step of reading the identification data packet, the video data packet, and the ancillary data packet from the head of the buffer, a data converting step of converting the video data packet into video data and converting the ancillary data packet into ancillary data, and a video ancillary data multiplexing step of multiplexing the video data and the ancillary data and outputting video/ancillary data.

A video-processing method according to still another aspect of the present disclosure includes a video ancillary data separating step of acquiring video/ancillary data from a photographing device and separating the video/ancillary data into video data and ancillary data, a packetizing step of packetizing the video data into a video data packet of a predetermined standard and packetizing the ancillary data into an ancillary data packet of the predetermined standard, a packet arranging step of arranging an identification data packet of the predetermined standard that identifies a frame from a head of the frame by a predetermined period and arranging the video data packet and the ancillary data packet, a packet writing step of writing the identification data packet, the video data packet, and the ancillary data packet in a buffer having a predetermined size so that the identification data packet is arranged at a head of the buffer, a packet reading step of reading the identification data packet, the video data packet, and the ancillary data packet from the head of the buffer, and a network frame transmitting step of transmitting the frame where the identification data packet is arranged by the predetermined period from the head of the frame and that includes the video data packet and the ancillary data packet via the network.

A video-processing method according to still another aspect of the present disclosure executed in a video-processing system including a transmitting device and a receiving device that are communicably connected, includes a video ancillary data separating step of acquiring video/ancillary data from a photographing device and separating the video/ancillary data into video data and ancillary data, as executed in the transmitting device, a packetizing step of packetizing the video data into a video data packet of a predetermined standard and packetizing the ancillary data into an ancillary data packet of the predetermined standard, as executed in the transmitting device, a packet arranging step of arranging an identification data packet of the predetermined standard that identifies a frame from a head of the frame by a predetermined period and arranging the video data packet and the ancillary data packet, as executed in the transmitting device, a packet writing step of writing the identification data packet, the video data packet, and the ancillary data packet in a buffer of a transmission side having a predetermined size so that the identification data packet is arranged at a head of the buffer of the transmission side, as executed in the transmitting device, a packet reading step of reading the identification data packet, the video data packet, and the ancillary data packet from the head of the buffer of the transmission side, as executed in the transmitting device, a network frame transmitting step of transmitting the frame where the identification data packet is arranged by the predetermined period from the head of the frame and that includes the video data packet and the ancillary data packet via the network, as executed in the transmitting device, a network frame receiving step of receiving the frame via the network, as executed in the receiving device, a packet writing step of writing the identification data packet, the video data packet, and the ancillary data packet in a buffer of a reception side having the predetermined size so that the identification data packet is arranged at a head of the buffer of the reception side, as executed in the receiving device, a packet reading step of reading the identification data packet, the video data packet, and the ancillary data packet from the head of the buffer of the reception side, as executed in the receiving device, a data converting step of converting the video data packet into the video data and converting the ancillary data packet into the ancillary data, as executed in the receiving device, and a video ancillary data multiplexing step of multiplexing the video data and the ancillary data and outputting the video/ancillary data, as executed in the receiving device.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, embodiments of a video-processing apparatus, a video-processing system, and a video-processing method according to the present disclosure will be explained in detail with reference to the drawings. The present disclosure is not limited to the embodiments.

Configuration of Embodiment

Figure 1:
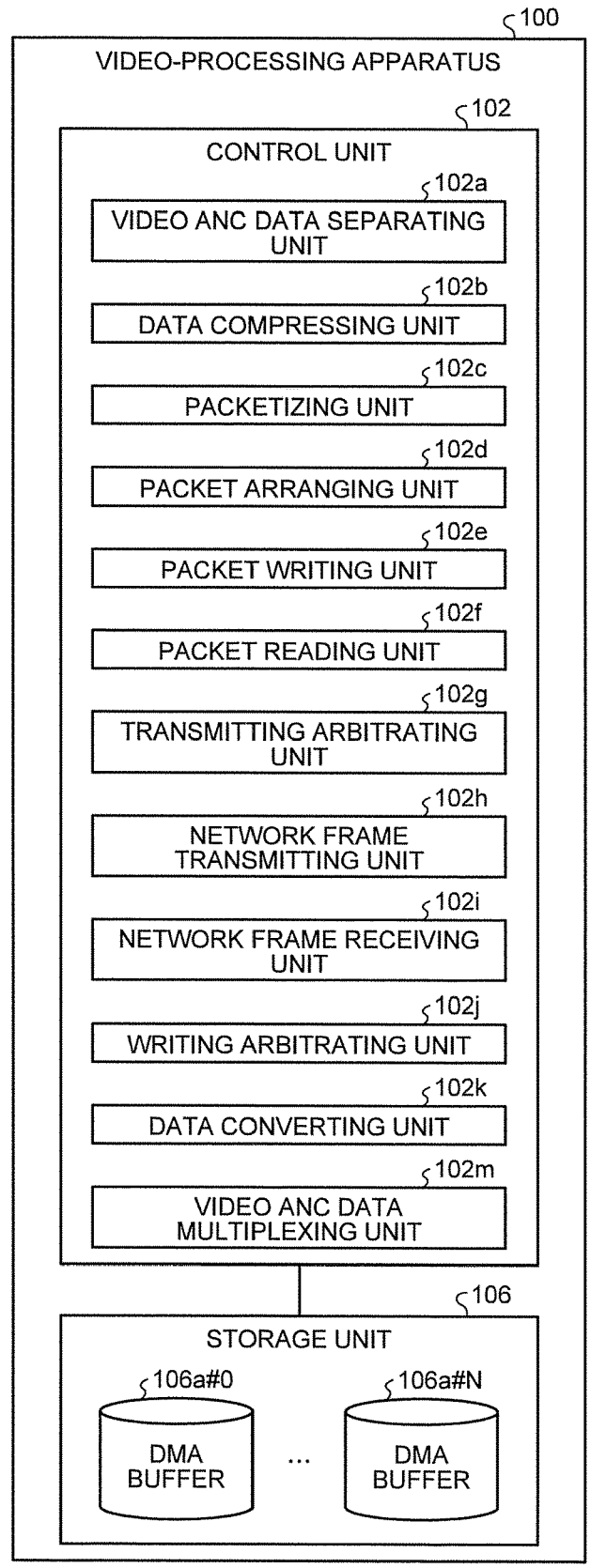
FIG. 1 is a block diagram of an example of a configuration of a video-processing apparatus according to an embodiment.

Hereinafter, an example of a configuration of a video-processing apparatus 100 according to an embodiment of the present disclosure will be explained with reference to FIGS. 1 and 2, and after that, processes and the like according to the embodiment will be explained in detail. FIG. 1 is a block diagram of an example of a configuration of the video-processing apparatus 100 according to the embodiment.

The embodiment explained hereinafter is an exemplary one of the video-processing apparatus 100 for embodying the spirit of the present disclosure, but the embodiment is not intended to specify the present disclosure to the video-processing apparatus 100. Video-processing apparatuses 100 according to other embodiments included in the Claims can also be embodied.

For example, a form of function distribution of the video-processing apparatus 100 exemplified in the embodiment is not limited to the later-explained one, but the video-processing apparatus can be configured by distribution or combination in arbitrary units in terms of functions or physical configuration within a range capable of exhibiting the same effects and functions.

First, as shown in FIG. 1, the video-processing apparatus 100 is schematically configured to include a control unit 102 and a storage unit 106. These components of the video-processing apparatus 100 are communicably connected to each other via an arbitrary communication line. In addition, the video-processing apparatus 100 is communicably connected to an external apparatus via a network 300.

The video-processing apparatus 100 may further include any one, some, or all of an input/output unit having a function of performing data input/output (I/O), an input/output interface unit, and a communication interface unit (not shown).

The input/output unit may be, for example, a key input unit, a touch panel, a control pad (for example, a touch pad, or a game pad), a mouse, a keyboard, or a microphone.

The input/output unit may be a display unit (for example, a display, a monitor, or a touch panel configured with a liquid crystal device, an organic EL device, or the like) which displays (input/output) information of an application or the like. In addition, the input/output unit may be a sound output unit (for example, a speaker) which outputs audio information as sound.

The input/output interface unit may be a video input/output interface such as an Serial Digital Interface (SDI) terminal, an High-Definition Multimedia Interface (HDMI) (registered trade mark) terminal, or a display port terminal.

The end of an input port constituting the input/output interface unit may be connected to a camera, a recorder, or the like; and the end of an output port constituting the input/output interface unit may be connected to a monitor (display), a recorder, or the like.

The communication interface unit may be a network interface (Network Interface Controller (NIC) or the like) for transmitting or receiving IP data by any one or both of wired communication and wireless communication (WiFi or the like) or an interface of performing wireless communication by Bluetooth (registered trade mark) or the like.

The storage unit 106 stores any one, some, or all of various database, tables, files, buffers (direct memory access (DMA) buffer 106a, or the like), and the like. In addition, the storage unit 106 may store a plurality of DMA buffers 106a (DMA buffer 106a#0 to DMA buffer 106a#N).

The storage unit 106 may store video data, ANC data, or the like. In addition, the storage unit 106 may store various application programs (for example, user applications).

The storage unit 106 is a storage unit which is, for example, any one, some, or all of a memory such as a RAM or a ROM, a fixed disk device such as a Hard Disk Drive (HDD), a Solid State Drive (SSD), a flexible disk, and an optical disk.

A computer program or the like for issuing commands to a Central Processing Unit (CPU) to execute various processes may be recorded in the storage unit 106.

Among the components of the storage unit 106, the buffer 106a stores packets. Herein, the buffer 106a may store any one, some, or all of an identification data packet which identifies a frame, a video data packet, an ancillary data packet, and the like.

The identification data packet, the video data packet, and the ancillary data packet may be an identification data packet of a predetermined standard, a video data packet of the predetermined standard, and an ancillary data packet of the predetermined standard.

The predetermined standard may be MPEG (MPEG1, MPEG2, MPEG4, or the like).

The identification data packet may include a payload ID which is different from those of the video data and the ancillary data. In addition, the identification data packet may include a header according to a predetermined standard and frame start data indicating as to whether to be a head of a frame.

The buffer 106a may have a predetermined size. Herein, the predetermined size may be a value of product of a packet size of the predetermined standard, the predetermined period, and an arbitrary natural number. In addition, the buffer 106a may store packets distinctively for each frame.

The control unit 102 is configured with a CPU and the like which execute an overall control over the video-processing apparatus 100. The control unit 102 includes an internal memory for storing a control program, a program regulating various procedures, and necessary data and performs an information process for executing various processes based on these programs.

The control unit 102 conceptually includes a video ANC data separating unit 102a, a data compressing unit 102b, a packetizing unit 102c, a packet arranging unit 102d, a packet writing unit 102e, a packet reading unit 102f, a transmitting arbitrating unit 102g, a network frame transmitting unit 102h, a network frame receiving unit 102i, a writing arbitrating unit 102j, a data converting unit 102k, and a video ANC data multiplexing unit 102m.

The video ANC data separating unit 102a acquires video/ancillary (ANC) data from a photographing device and separates video data and ancillary (ANC) data. Herein, the video ANC data separating unit 102a may acquire video/ancillary data from a plurality of photographing devices (cameras or the like).

The data compressing unit 102b may compress the video data separated by the video ANC data separating unit 102a. Herein, the data compressing unit 102b may compress the video data separated by the video ANC data separating unit 102a in a JPEG200 method to output the video data as a J2K stream.

The packetizing unit 102c packetizes the video data into the video data packet of the predetermined standard and packetizes the ancillary data into the ancillary data packet of the predetermined standard. Herein, the predetermined standard may be Packetized Elementary Stream (PES), MPEG2-Transport Stream (TS), or the like.

The packet arranging unit 102d arranges the identification data packet of the predetermined standard which identifies a frame from a head of the frame by a predetermined period and arranges the video data packet of the predetermined standard and the ancillary data packet of the predetermined standard.

The predetermined period may be an interval equal to a sum of the number of video data packets and the number of ancillary data packets included in the frame transmitted or received via the network 300.

The packet writing unit 102e writes the identification data packet of the predetermined standard, the video data packet of the predetermined standard, and the ancillary data packet of the predetermined standard in a buffer having a predetermined size so that the identification data packet of the predetermined standard is arranged at the head of the buffer 106a.

The packet writing unit 102e may write the identification data packet of the predetermined standard, the video data packet of the predetermined standard, and the ancillary data packet of the predetermined standard in a buffer so that the identification data packet of the predetermined standard which indicates the head of a frame is arranged at the head of the buffer 106a.

The identification data packet of the predetermined standard which indicates the head of a frame may be an MPEG2-TS (SOF=1b) packet as individual data.

The packet writing unit 102e may write the identification data packet of the predetermined standard, the video data packet of the predetermined standard, and the ancillary data packet of the predetermined standard in a buffer so that the identification data packet of the predetermined standard which does not indicate the head of a frame is arranged at the head of the buffer 106a.

The identification data packet of the predetermined standard which does not indicate the head of a frame may be an MPEG2-TS (SOF=0b) packet as individual data.

The packet reading unit 102f reads the identification data packet of the predetermined standard, the video data packet of the predetermined standard, and the ancillary data packet of the predetermined standard from the head of the buffer 106a.

The packet reading unit 102f may search for head of the buffer 106a to detect an identification data packet of the predetermined standard which indicates a head of a frame which is originated from a different channel in comparison with the frame (currently being read) and read, from the head of the buffer 106a where the identification data packet is written the identification data packet which is originated from the different channel, the video data packet of the predetermined standard which is originated from the different channel, and the ancillary data packet of the predetermined standard which is originated from the different channel.

When there is a frame originated from a different channel where the identification data packet of the predetermined standard is arranged by a predetermined period from the head of the frame and which includes the video data packet of the predetermined standard and the ancillary data packet of the predetermined standard, the transmitting arbitrating unit 102g arbitrates (takes balance of) transmission of the frame to the network frame transmitting unit 102h.

Namely, when there are the frames originated from different channels, the transmitting arbitrating unit 102g may arbitrate transmission by the network frame transmitting unit 102h.

The network frame transmitting unit 102h transmits the frame where the identification data packet of the predetermined standard is arranged by the predetermined period from the head of the frame and which includes the video data packet of the predetermined standard and the ancillary data packet of the predetermined standard via the network 300.

The network frame receiving unit 102i receives, via the network 300, the frame including the video data packet of the predetermined standard, the ancillary data packet of the predetermined standard, and the identification data packet of a predetermined standard that identifies the frame and is arranged by a predetermined period from a head of the frame.

When the frames originated from different channels are received, the writing arbitrating unit 102j arbitrates (takes balance of) writing of the packet writing unit 102e.

The data converting unit 102k converts the video data packet into video data and converts the ancillary data packet into ancillary data. Herein, the data converting unit 102k may further discard the identification data packet.

The video ANC data multiplexing unit 102m multiplexes the video data and the ancillary data and outputs the video/ancillary data (to a monitor, a recorder, or the like).

An example of a hardware configuration of the video-processing apparatus 100 according to the embodiment will be explained with reference to FIG. 2. FIG. 2 is a hardware configuration diagram of an example of a configuration of the video-processing apparatus 100 according to the embodiment.

Figure 2:
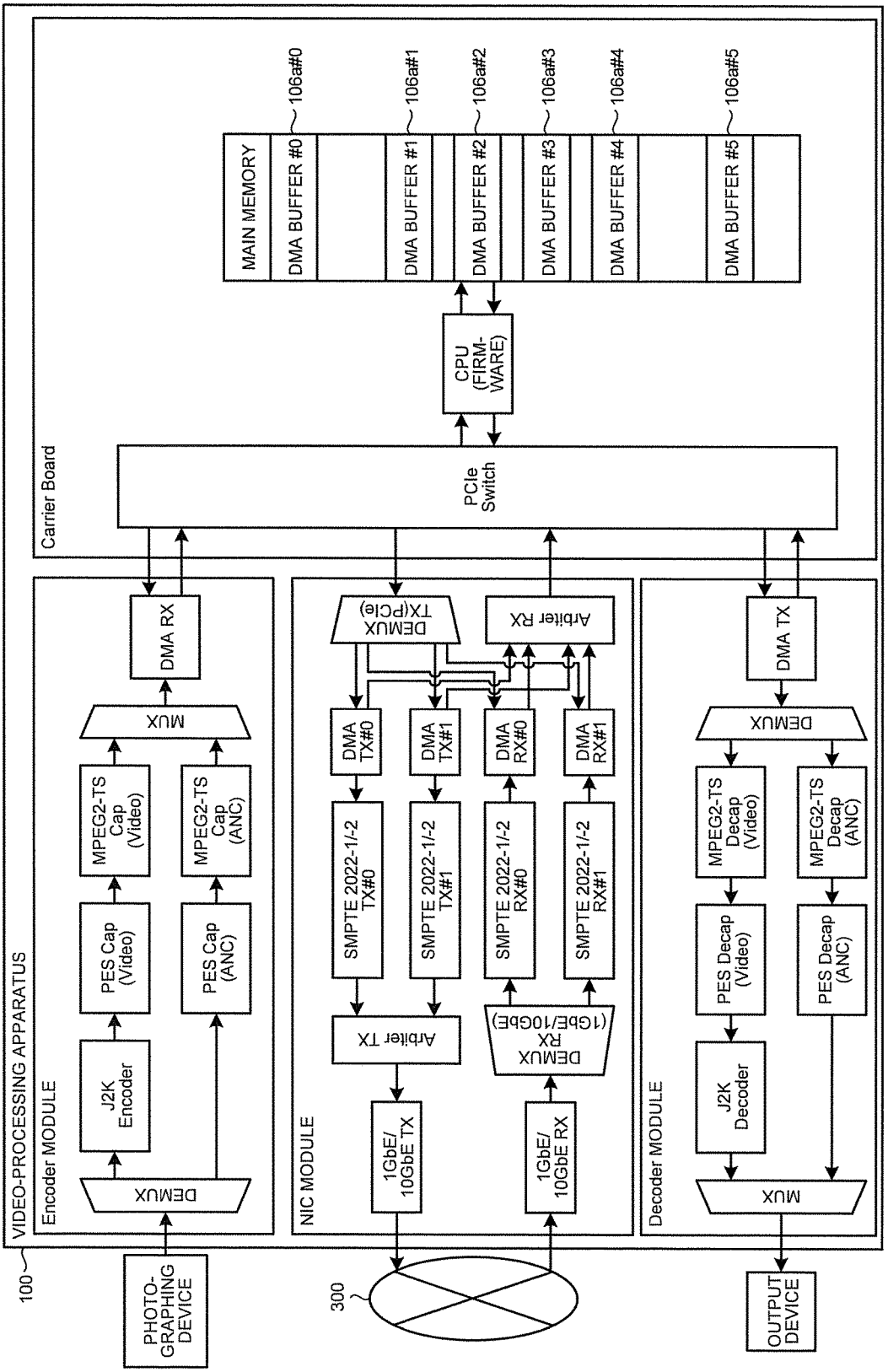
FIG. 2 is a hardware configuration diagram of an example of a configuration of the video-processing apparatus according to the embodiment.

As shown in FIG. 2, the video-processing apparatus 100 has such a module configuration so that, by changing a module, a configuration of being input with the video/ANC data and transmitting the data to the network 300 and a configuration of receiving a packet from the network 300 and outputting the video/ANC data to a display or the like can be switched.

The video-processing apparatus 100 is configured to include an encoder module (video data compressor) which acquires the video/ANC data from a photographing device such as a camera, an NIC module (network frame transceiver) which transmits or receives data (packet or the like) via the network 300, and a decoder module (video data decoder) which outputs the video/ANC data to an output device such as a display.

The video-processing apparatus 100 is configured to include a mechanism of interconnecting these modules at a high speed, and in order to implement the interconnection between the modules, a PCIe switch and a main memory are connected through a CPU where the firmware operates.

The modules are interconnected through the PCIe switch and the main memory; data of the predetermined standard (MPEG2-TS or the like) are exchanged between the modules and the main memory; and data transfer may be performed in a Direct Memory Access (DMA).

The hardware configuration of the encoder module will be explained with reference to FIG. 2.

The DEMUX (video ANC data separating unit 102a) receives the video/ANC data from the photographing devices such as a camera and separates the video data and the ANC data.

The J2K encoder (data compressing unit 102b) compresses the video data output from the DEMUX in a JPEG2000 method and outputs a J2K stream.

A PES Cap (Video) (packetizing unit 102c) packetizes the J2K stream output from the J2K encoder by a predetermined unit and outputs the packetized J2K stream as a PES packet.

A MPEG2-TS Cap (Video) (packetizing unit 102c) packetizes the PES packet output from the PES Cap (Video) by a predetermined unit and outputs the packetized PES packet as ah MPEG2-TS packet.

A PES Cap (ANC) (packetizing unit 102c) packetizes the ANC data output from the DEMUX and outputs the packetized ANC data as a PES packet.

An MPEG2-TS Cap (ANC) (packetizing unit 102c) packetizes the PES packet output from the PES Cap (ANC) by a predetermined unit and outputs the packetized PES packet as an MPEG2-TS packet.

A MUX (packet arranging unit 102d) arranges the MPEG2-TS packet output from the MPEG2-TS Cap (Video) and the MPEG2-TS packet output from the MPEG2-TS Cap (ANC) and outputs the arranged packets.

The MUX arranges individual data (MPEG2-TS (SOF=xb) packets) by a predetermined period (for example, every six MPEG2-TS).

The MUX arranges the MPEG2-TS (SOF=1b) packet just in front of the MPEG2-TS packet including data of the head of the video frame. In addition, in the case of other than the head of the video frame, the MUX arranges an MPEG2-TS (SOF=0b) packet.

The MUX is notified of information which is to be stored in the MPEG2-TS (SOF=xb) packet by the firmware (control unit 102).

The DMA RX (packet writing unit 102e) writes the MPEG2-TS packet output from the MUX in the DMA buffer 106a of the main memory by the DMA. Herein, the DMA RX is notified of a head address and a size of the DMA buffer 106a by the firmware.

When writing the MPEG2-TS (SOF=1b) packet, the DMA RX switches the DMA buffer 106a. Therefore, the MPEG2-TS (SOF=1b) packet, that is, the data of the head of the video frame is necessarily arranged at the head of the DMA buffer 106a.

The size of the DMA buffer 106a is controlled by the firmware and may be, for example, "size (188 bytes or the like) of the MPEG2-TS packet "×" insert interval of the MPEG2-TS (SOF=xb) packet"×"N (N=1, 2, 3, . . . )".

Therefore, the head of the DMA buffer 106a necessarily becomes the MPEG2-TS (SOF=xb) packet.

A hardware configuration of the NIC module will be explained with reference to FIG. 2.

The DEMUX TX (PCIe) (control unit 102) receives and analyzes the PCIe packet output from the PCIe switch and outputs the PCIe packet to the DMA TX indicated by the destination of the PCIe packet.

The DMA TX (packet reading unit 102f) is notified of a head address and a size of the DMA buffer 106a by the firmware.

The DMA TX reads the MPEG2-TS packet sequentially from the head of the DMA buffer 106a and outputs the MPEG2-TS packet to the SMPTE 2022-1/-2 TX.

The SMPTE 2022-1/-2 TX (control unit 102) receives the MPEG2-TS packet from the DMA TX, encapsulates (provides an IP/UDP/RTP header) the MPEG2-TS packet in a frame according to the SMPTE 2022-1/-2, and outputs the frame to an Arbiter TX.

The number of MPEG2-TS packets included in the frame can be set and changed by the firmware and is allowed to be equal to the insert interval of the MPEG2-TS (SOF=xb) packet.

Therefore, one MPEG2-TS (SOF=xb) packet is necessarily included in the entire frame.

The Arbiter TX (transmitting arbitrating unit 102g) receives the frame from each SMPTE 2022-1/-2 TX, arbitrates the frame, and outputs the frame to a 1 GbE/10 GbE TX.

The 1 GbE/10 GbE TX (network frame transmitting unit 102h) receives the frame from the Arbiter TX and outputs the frame to the external network 300.

The 1 GbE/10 GbE RX (network frame receiving unit 102i) receives the frame from the external network 300 and outputs the frame to the DEMUX RX (1 GbE/10 GbE).

The DEMUX RX (1 GbE/10 GbE) (control unit 102) receives and analyzes the frame from the 1 GbE/10 GbE RX and outputs the frame to the SMPTE 2022-1/-2 RX indicated by the destination of the frame.

The SMPTE 2022-1/-2 RX (control unit 102) receives the frame from the DEMUX RX (1 GbE/10 GbE), extracts the MPEG2-TS packet, and outputs the MPEG2-TS packet to the DMA RX.

The DMA RX (packet writing unit 102e) receives the MPEG2-TS packet from the SMPTE 2022-1/-2 RX and writes MPEG2-TS packet in the DMA buffer 106a of the main memory through an Arbiter RX.

The Arbiter RX (writing arbitrating unit 102j) arbitrates write requests of a plurality of DMA RXs to the main memory, serializes the write requests, and outputs the serialized write requests to the PCIe switch.

When writing the MPEG2-TS (SOF=1b) packet, the DMA RX switches the DMA buffer 106a. Therefore, the MPEG2-TS (SOF=1b) packet, that is, the data of the head of the video frame is necessarily arranged at the head of the DMA buffer 106a.

A hardware configuration of the decoder module will be explained with reference to FIG. 2.

The DMA TX (packet reading unit 102f) is notified of a head address and a size of the DMA buffer 106a by the firmware.

The DMA TX reads the MPEG2-TS packet sequentially from the head of the DMA buffer 106a and outputs the MPEG2-TS packet to the DEMUX.

The DEMUX (packet reading unit 102f) analyzes the MPEG2-TS packet, extracts the MPEG2-TS (Video) packet and the MPEG2-TS (ANC) packet, and discards the MPEG2-TS (SOF=xb) packet.

The DEMUX outputs the MPEG2-TS (Video) packet to the MPEG2-TS Decap (Video) and outputs the MPEG2-TS (ANC) packet to the MPEG2-TS Decap (ANC).

The MPEG2-TS Decap (Video) (data converting unit 102k) receives the MPEG2-TS (Video) packet from the DEMUX, converts the MPEG2-TS (Video) packet into a PES packet, and outputs the PES packet to the PES Decap (Video).

The PES Decap (Video) (data converting unit 102k) receives the PES packet from the MPEG2-TS Decap (Video), converts the PES packet into a J2K stream, and outputs the J2K stream to the J2K decoder.

The J2K decoder (data converting unit 102k) receives the J2K stream from the PES Decap (Video), converts the J2K stream into video data, and outputs the video data to the MUX.

The MPEG2-TS Decap (ANC) (data converting unit 102k) receives the MPEG2-TS (ANC) packet from the DEMUX, converts the MPEG2-TS (ANC) packet into a PES packet, and outputs the PES packet to the PES Decap (ANC).

The PES Decap (ANC) (data converting unit 102k) receives the PES packet from the MPEG2-TS Decap (ANC), converts the PES packet into ANC data, and outputs the ANC data to the MUX.

The MUX (video ANC data multiplexing unit 102m) receives the video data from the J2K decoder and the ANC data from the PES Decap (ANC), multiplexes the video data and the ANC data, and outputs the multiplexed data to an external output device such as a display.

An example of functions of firmware (control unit 102) operating in the CPU will be explained with reference to FIG. 2.

The firmware controls the securing of the DMA buffer 106a used by each module on the main memory.

The firmware controls the transfer of the MPEG2-TS packet from the encoder module to the NIC module.

The firmware notifies configuration information (head address and size) of the secured buffer area to the DMA RX of the encoder module.

The firmware receives a notification of the DMA completion from the encoder module to the DMA buffer 106a and copies the MPEG2-TS packet in the DMA buffer 106a to the DMA buffer 106a corresponding to the NIC module.

The firmware releases the buffer area of the DMA buffer 106a of which copying is completed (writes 0 in the entire area) and notifies the completion to the DMA RX of the encoder module.

The firmware copies the MPEG2-TS packet from the encoder module to the DMA buffer 106a corresponding to the DMA TX of the NIC module and, after that, notifies configuration information of the DMA buffer 106a to the DMA TX of the NIC module.

When the firmware receives a notification that the acquisition of the MPEG2-TS packet stored in the DMA buffer 106a is completed from the DMA TX of the NIC module, the firmware releases the buffer.

The firmware controls the transfer of the MPEG2-TS packet from the NIC module to the decoder module. Herein, the firmware notifies configuration information (head address and size) of the secured buffer area of the DMA buffer 106a to the DMA RX of the NIC module.

The firmware receives a notification of the DMA completion from the NIC module to the DMA buffer 106a and copies the MPEG2-TS packet stored in the DMA buffer 106a to the buffer area of the DMA buffer 106a corresponding to the decoder module.

The firmware releases the area of the DMA buffer 106a of which copying is completed and notifies the completion to the DMA RX of the NIC module.

The firmware copies the MPEG2-TS packet from the NIC module to the DMA buffer 106a corresponding to the DMA TX of the decoder module and, after that, notifies configuration information (head address and size) of the DMA buffer 106a to the DMA TX of the decoder module.

When the firmware receives a notification that the acquisition of the MPEG2-TS packet in the DMA buffer 106a is completed from the DMA TX of the decoder module, the firmware releases the DMA buffer 106a.

The firmware controls a video channel switch operation. For example, as explained in FIG. 2, the firmware stores the MPEG2-TS packet from the DMA RX#0 of the NIC module in the DMA buffer 106a#3 and stores the video data from the other DMA RX#1 in the DMA buffer 106a#4.

In general, the firmware stores the MPEG2-TS packet stored in the DMA buffer 106a#3 in the DMA buffer 106a#5 and instructs the DMA TX of the decoder module to output the MPEG2-TS packet of the DMA buffer 106a#5.

When receiving a video channel switch instruction, the firmware searches the DMA buffer 106a#3 and the DMA buffer 106a#4 for the MPEG2-TS (SOF=1b) packet (head of the video frame).

At this time, since the MPEG2-TS (SOF=1b) packet is necessarily present at the head of the DMA buffer 106a, the firmware may search for only the MPEG2-TS packet present at the head of each DMA buffer 106a without necessarily analyzing the entire MPEG2-TS packets, so that high speed detection can be performed.

When the firmware detects the MPEG2-TS (SOF=1b) packet from the DMA buffer 106a#3 and the DMA buffer 106a#4, in general, the firmware copies the MPEG2-TS (SOF=1b) packet stored in the DMA buffer 106a#4 at a time of copying the MPEG2-TS (SOF=1b) packet stored in the DMA buffer 106a#3 to the DMA buffer 106a#5.

The firmware switches the data which are to be copied to the DMA buffer 106a#5 from the DMA buffer 106a#3 to the DMA buffer 106a#4.

Therefore, the video channel switching can be implemented, and an abnormal video frame can be prevented from being output at the time of switching (different video data can be prevented from being mixed in the same video frame).

The firmware controls notification of operation instruction and control information from the video-processing apparatus (transmitting device) 100-1 which receives the video/ANC data from the camera or the like to the firmware of the video-processing apparatus (receiving device) 100-2 which outputs the video/ANC data to the display or the like.

The firmware of the transmitting device 100-1 notifies to the MUX of the encoder module the operation instruction and the control information to the firmware of the receiving device 100-2 stored in the MPEG2-TS (SOF=xb) packet.

The firmware of the receiving device 100-2 acquires the operation instruction and the control information from the transmitting device 100-1 by extracting the MPEG2-TS (SOF=xb) packet in the DMA buffer 106a in which the DMA RX of the NIC module stores the MPEG2-TS packet.

Since one MPEG2-TS (SOF=xb) packet is necessarily stored in the entire frame which is transmitted or received on the network 300, although any frame is lost, the operation instruction and the control information from the transmitting device 100-1 are not lost.

The transmitting device 100-1 can transmit the operation instruction and the control information to the receiving device 100-2 irrespective of the network quality.

Since the MPEG2-TS (SOF=xb) packets are arranged by a predetermined interval in an MPEG2-TS packet, the firmware can extract the MPEG2-TS (SOF=xb) packet from the DMA buffer 106a.

Therefore, the firmware can extract the MPEG2-TS (SOF=xb) packet from the DMA buffer 106a in the main memory at a high speed without necessarily analyzing the entire MPEG2-TS packets.

Processes According to Embodiment

Figure 3:
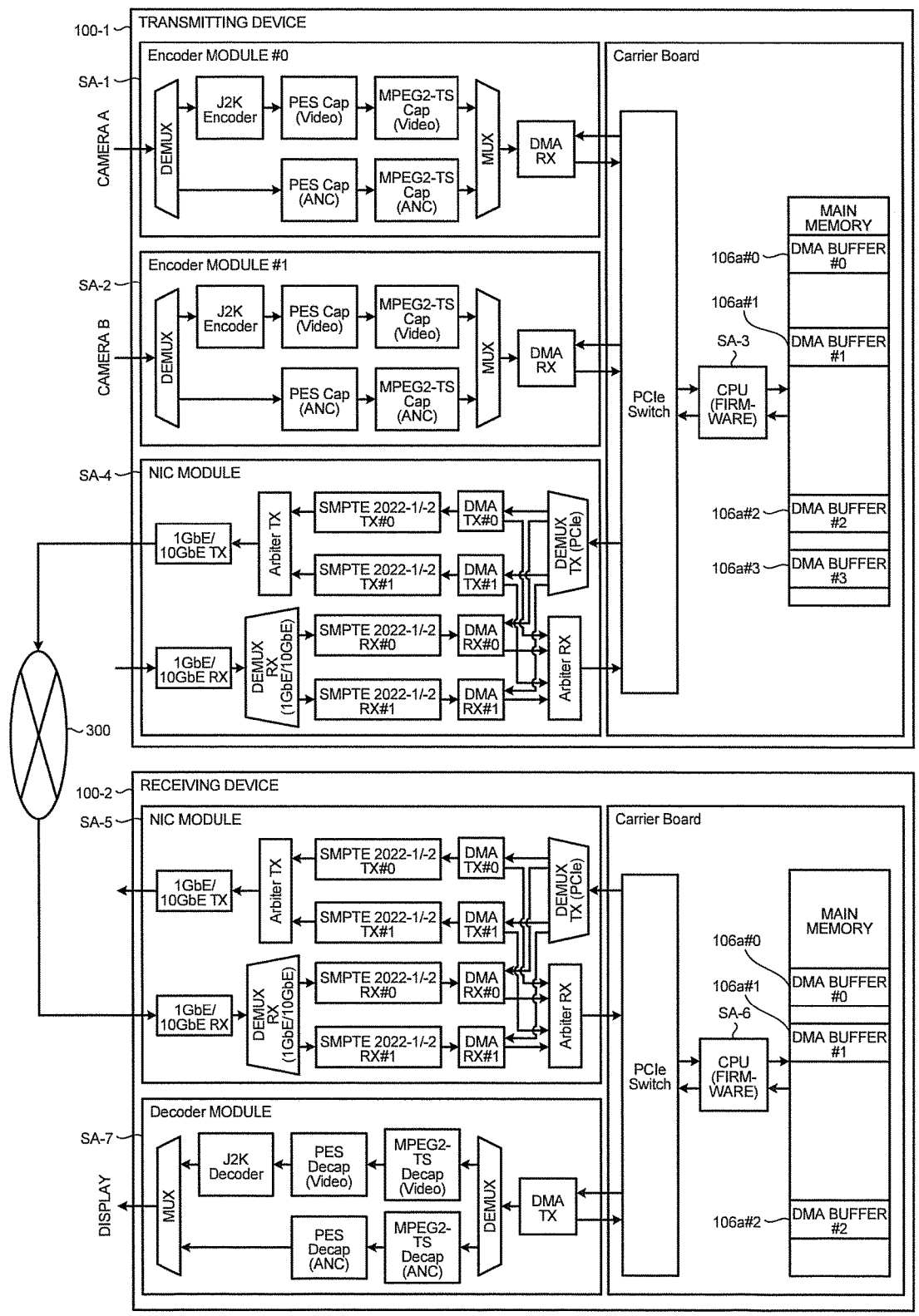
FIG. 3 is a flow diagram of an example of a process of a video-processing system according to the embodiment.

An example of a process executed by the video-processing system having the above-explained configuration will be explained with reference to FIGS. 3 to 16. FIG. 3 is a flow diagram of an example of a process (channel switching process) in a video-processing system according to the embodiment.

As shown in FIG. 3, the video-processing system is schematically configured so that the video-processing apparatus (transmitting device) 100-1 and the video-processing apparatus (receiving device) 100-2 are communicably connected via the network 300.

As shown in FIG. 3, first, the encoder module #0 of the transmitting device 100-1 receives the video/ANC data from the camera A, converts the video/ANC data into the MPEG2-TS (camera A) packet, and stores the MPEG2-TS (camera A) packet in the DMA buffer 106a#0 of the main memory (Step SA-1).

The encoder module #1 of the transmitting device 100-1 receives the video/ANC data from the camera B, converts the video/ANC data into the MPEG2-TS (camera B) packet, and stores the MPEG2-TS (camera B) packet in the DMA buffer 106a#1 of the main memory (Step SA-2).

An example of processes of the encoder module according to the embodiment will be explained with reference to FIGS. 4 to 8.

Figure 4:
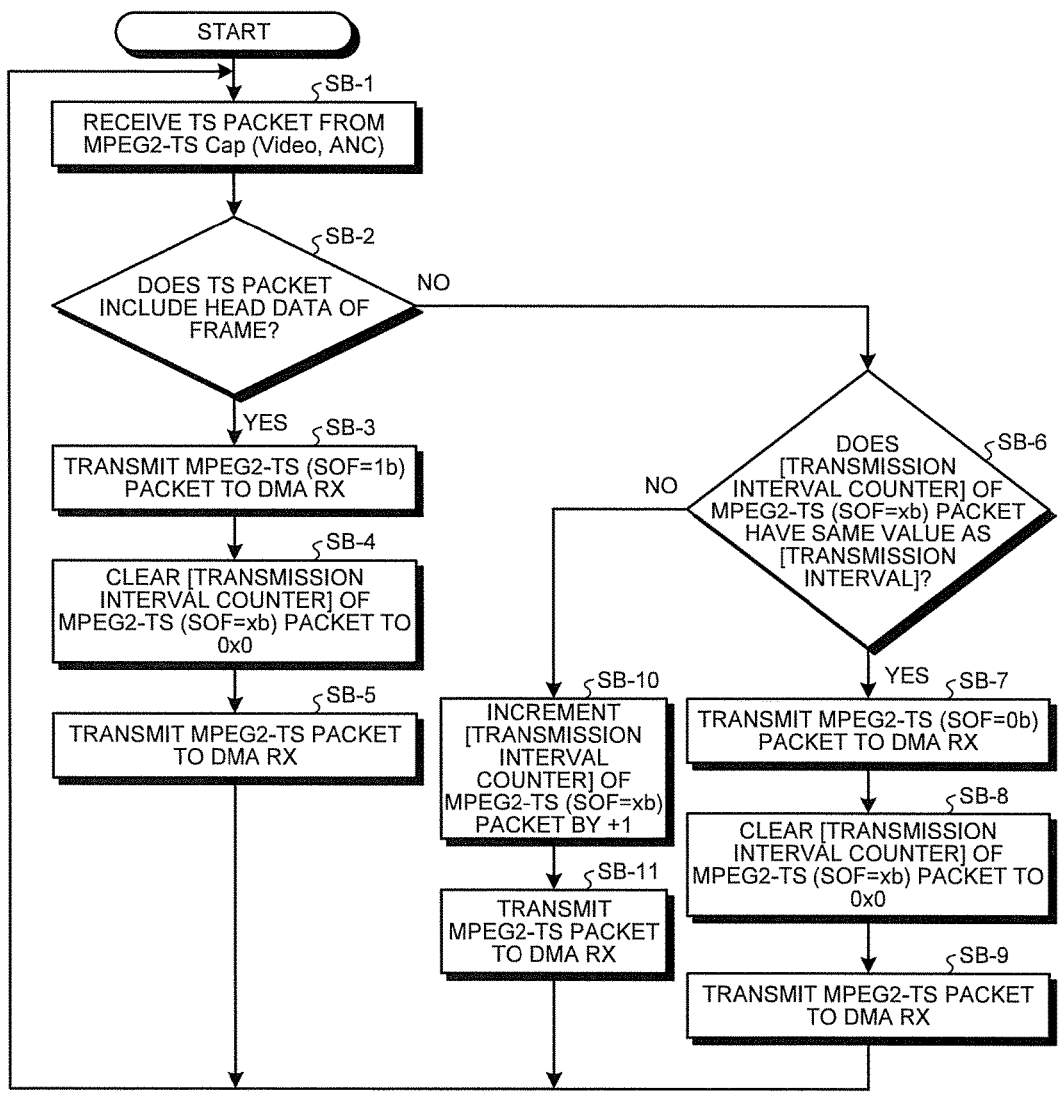
FIG. 4 is a flowchart of an example of a process of the video-processing apparatus according to the embodiment.

First, an example of a process of the MUX of the encoder module according to the embodiment will be explained with reference to FIGS. 4 to 6. FIG. 4 is a flowchart of an example of a process in the video-processing apparatus 100 according to the embodiment.

As shown in FIG. 4, first, the MUX (packet arranging unit 102d) of the transmitting device 100-1 receives the MPEG2-TS packet from the MPEG2-TS Cap (Video) and the MPEG2-TS Cap (ANC) (Step SB-1).

The MUX of the transmitting device 100-1 determines whether the MPEG2-TS packet includes the head data of the frame (is an identification data packet indicating the head of the frame) (Step SB-2).

An example of the identification data packet according to the embodiment will be explained with reference to FIG. 5. FIG. 5 is a diagram of an example of the identification data packet according to the embodiment.

Figure 5:
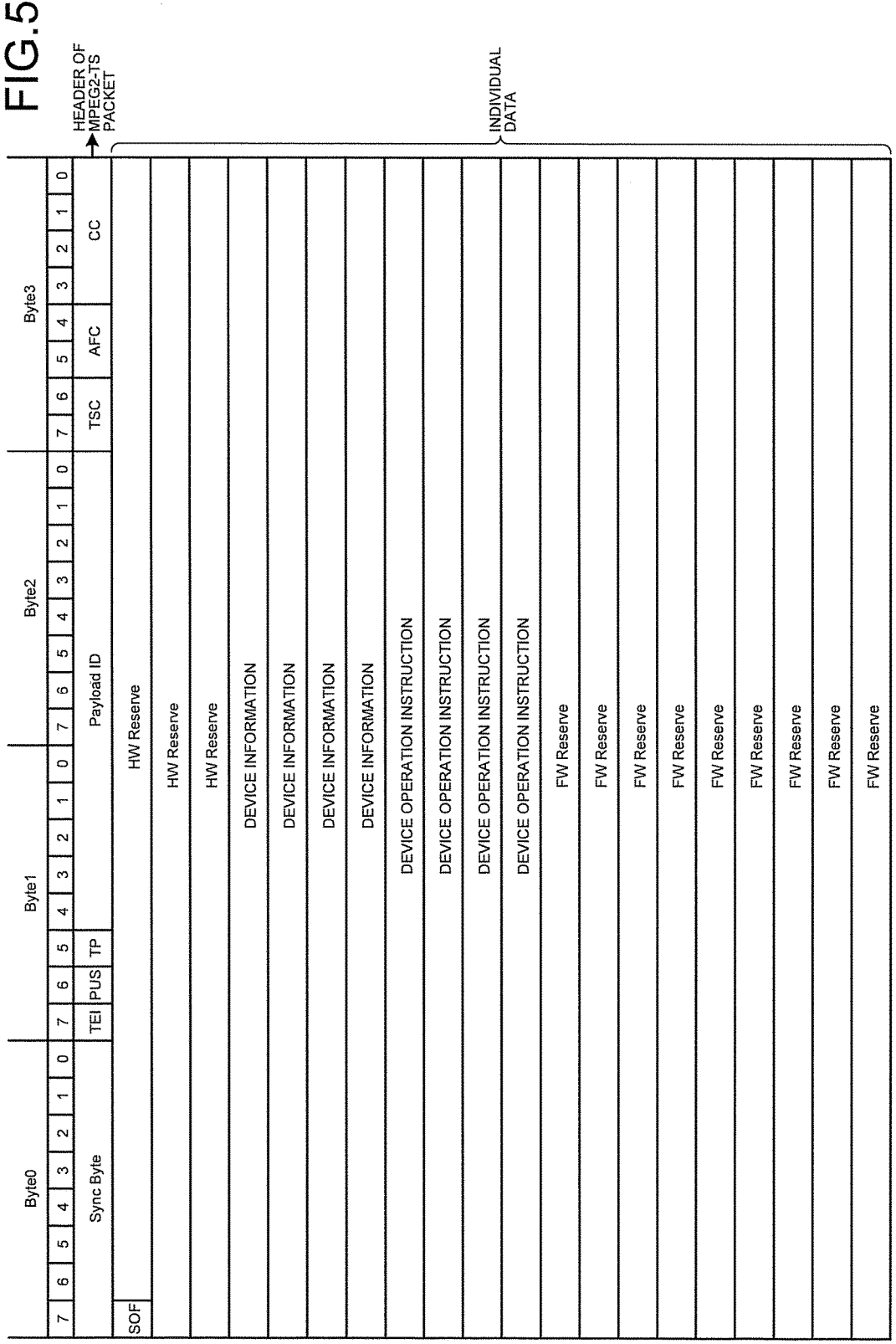
FIG. 5 is a diagram of an example of an identification data packet according to the embodiment.

As shown in FIG. 5, the identification data packet (MPEG2-TS (SOF=xb) packet) including the individual data according to the embodiment includes a header of the MPEG2-TS packet and a Start Of Frame (SOF) as a bit indicating that the MPEG2-TS packet including the head frame data of the video follows.

The case where the SOF is 1b may indicate that the following MPEG2-TS packet includes the data of the head frame of the video; and the case where the SOF is 0b may indicate that the following MPEG2-TS packet does not include the data of the head frame of the video.

In this manner, the individual data may be stored in the MPEG2-TS packet having a Payload ID (PID) which is different from those of the video data and the ANC data.

Namely, according to the embodiment, the individual data having a PID which is different from those of the video data and the ANC data are stored in the data portion of the MPEG2-TS packet, so that the individual data are in accordance with a general standard of the MPEG2-TS.

Therefore, according to the embodiment, while mutual compatibility between devices of different types of venders connected via the network 300 can be maintained, the transmission and reception of the video/ANC data can be performed.

Returning to FIG. 4, when the MUX of the transmitting device 100-1 determines that the MPEG2-TS packet does not include the head data of the frame (No at Step SB-2), the processing is shifted to Step SB-6.

On the other hand, when the MUX of the transmitting device 100-1 determines that the MPEG2-TS packet includes the head data of the frame (Yes at Step SB-2), the processing is shifted to Step SB-3.

The MUX of the transmitting device 100-1 transmits the MPEG2-TS (SOF=1b) packet to the DMA RX (packet writing unit 102e) (Step SB-3).

The MUX of the transmitting device 100-1 clears a transmission interval counter of the MPEG2-TS (SOF=xb) packet to 0x0 (Step SB-4). Herein, the transmission interval may be a value determining the timing when the MPEG2-TS (SOF=xb) packet is to be arranged between the MPEG2-TS packets.

The transmission interval is an interval of the number of MPEG2-TS packets and may also be an interval of transmitting the MPEG2-TS (SOF=xb) packet as the individual data to the DMA RX. In addition, the transmission interval counter may also be the number of MPEG2-TS packets which the MUX transmits to the DMA RX.

The MUX of the transmitting device 100-1 transmits the MPEG2-TS packet to the DMA RX (Step SB-5) and then the processing is shifted to Step SB-1.

On the other hand, the MUX of the transmitting device 100-1 determines whether the transmission interval counter of the MPEG2-TS (SOF=xb) packet has the same value as the transmission interval (Step SB-6).

When the MUX of the transmitting device 100-1 determines that the transmission interval counter of the MPEG2-TS (SOF=xb) packet does not have the same value as the transmission interval (No at Step SB-6), the processing is shifted to Step SB-10.

On the other hand, when the MUX of the transmitting device 100-1 determines that the transmission interval counter of the MPEG2-TS (SOF=xb) packet has the same value as the transmission interval (Yes at Step SB-6), the processing is shifted to Step SB-7.

The MUX of the transmitting device 100-1 transmits the MPEG2-TS (SOF=0b) packet to the DMA RX (Step SB-7).

The MUX of the transmitting device 100-1 clears the transmission interval counter of the MPEG2-TS (SOF=xb) packet to 0x0 (Step SB-8).

The MUX of the transmitting device 100-1 transmits the MPEG2-TS packet to the DMA RX (Step SB-9) and then the processing is shifted to Step SB-1.

On the other hand, the MUX of the transmitting device 100-1 increments the transmission interval counter of the MPEG2-TS (SOF=xb) packet by +1 (Step SB-10).

The MUX of the transmitting device 100-1 transmits the MPEG2-TS packet to the DMA RX (Step SB-11) and then the processing is shifted to Step SB-1.

An example of generation of the MPEG2-TS packet in the encoder module according to the embodiment will be explained with reference to FIG. 6. FIG. 6 is a diagram of an example of generation of the MPEG2-TS packet in the encoder module according to the embodiment.

Figure 6:
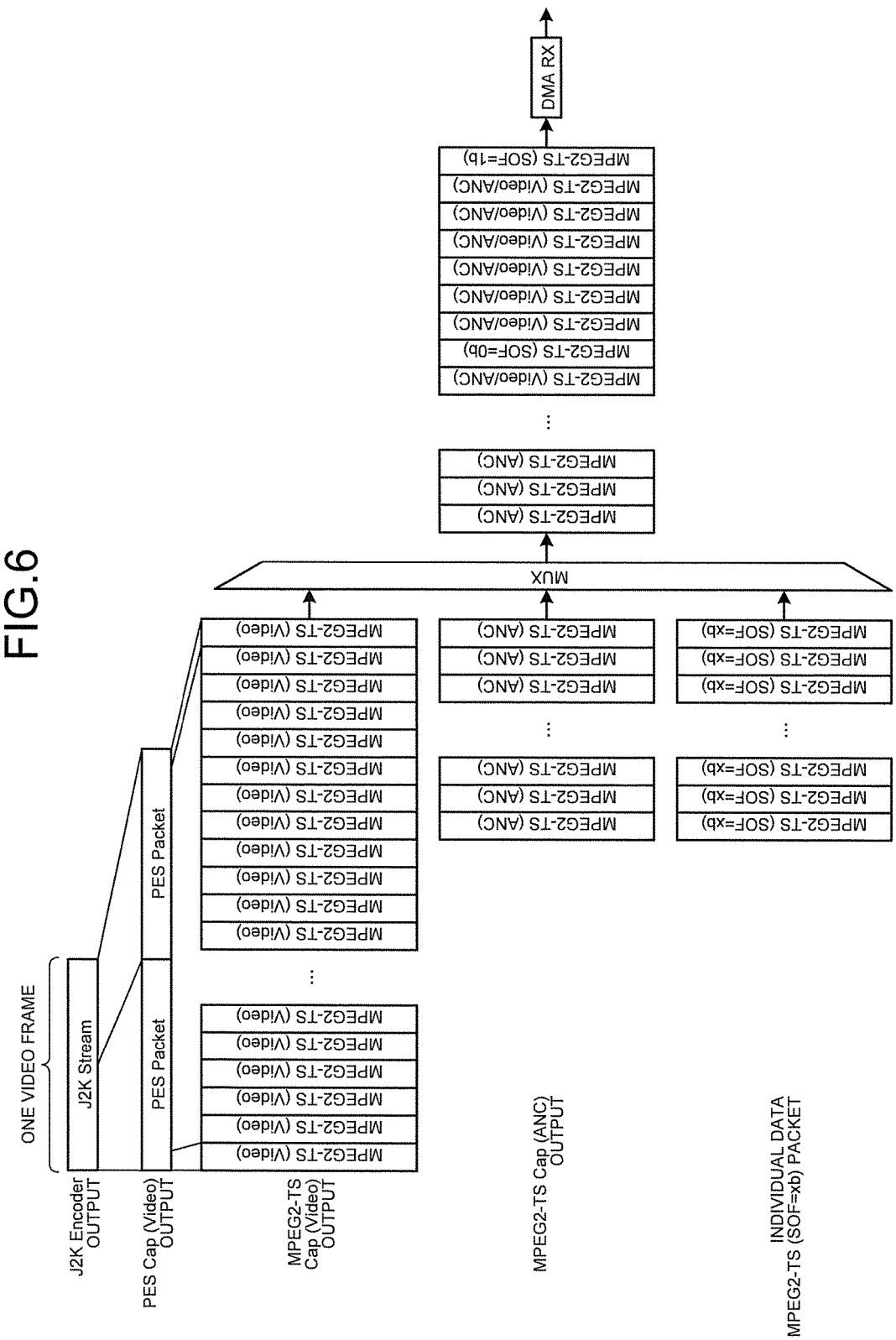
FIG. 6 is a diagram of an example of generation of an MPEG2-TS packet in an encoder module according to the embodiment.

As shown in FIG. 6 the MUX of the encoder module arranges the MPEG2-TS (SOF=xb) packets by a predetermined period (for example, seven packets).

The MUX of the encoder module arranges the MPEG2-TS (SOF=1b) packet just in front of the MPEG2-TS packet including the head of the video data and arranges the MPEG2-TS (SOF=0b) packet just in front of the MPEG2-TS packet not including the head of the video data.

Namely, the encoder module may arrange the identification data packets (MPEG2-TS (SOF=xb) packets) by a predetermined period between the MPEG2-TS packets.

The encoder module may detect the head of the video frame and may arrange the identification data packets (MPEG2-TS (SOF=1b) packets) of which the SOF bit is set to 1b just in front of the MPEG2-TS packet including the head data of the video frame.

In this manner, before being transmitted to the network 300, the video/ANC data are converted into a data format of the MPEG2-TS, and thus, the frame including the MPEG2-TS packet is transmitted to the network 300.

Figure 7:
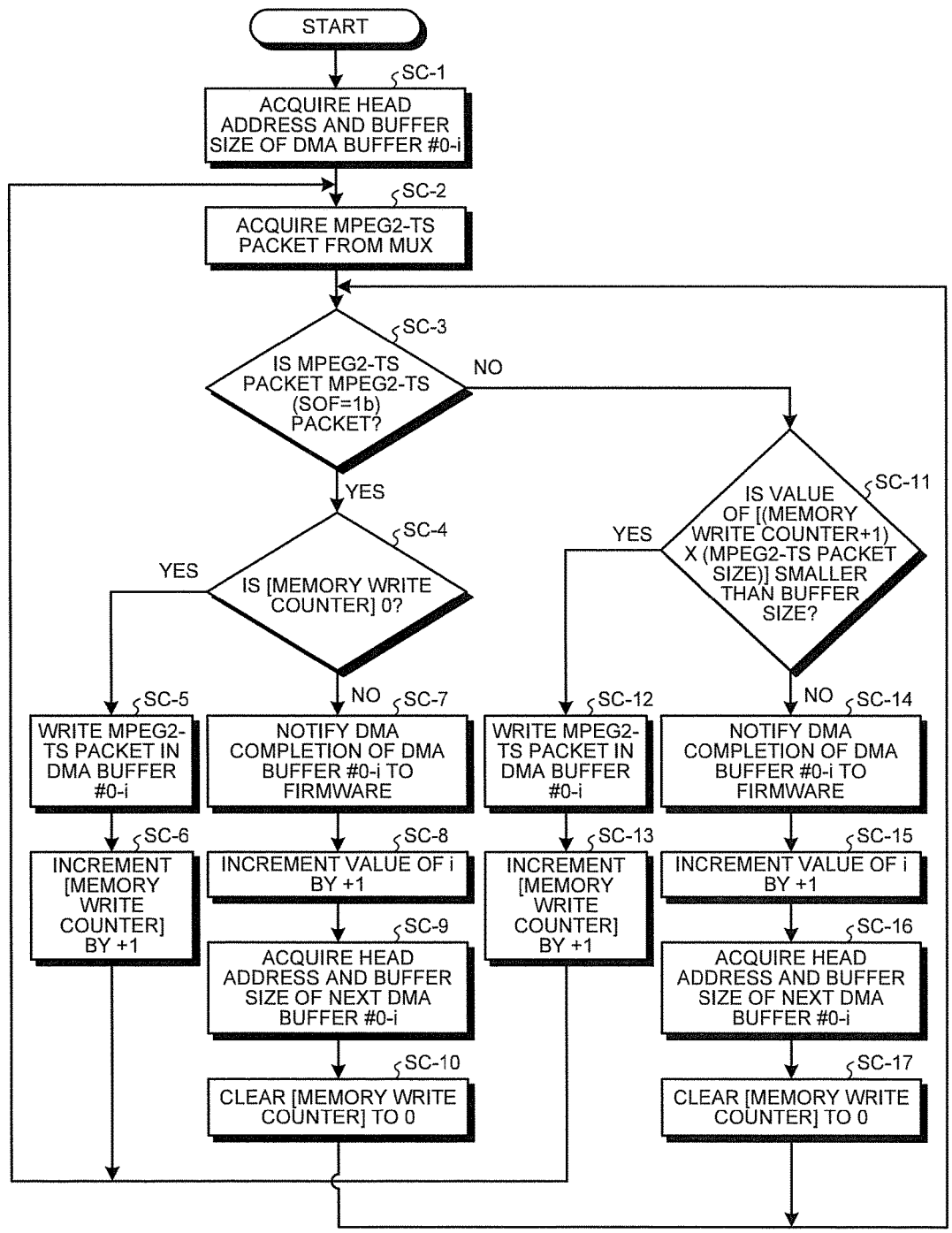
FIG. 7 is a flowchart of an example of a process of the video-processing apparatus according to the embodiment.

An example of a process of the DMA RX of the encoder module #0 according to the embodiment will be explained with reference to FIGS. 7 and 8. FIG. 7 is a flowchart of an example of a process in the video-processing apparatus 100 according to the embodiment.

As shown in FIG. 7, first, the DMA RX (packet writing unit 102*e*) of the encoder module #0 of the transmitting device 100-1 acquires a head address and a buffer size of the DMA buffer 106*a*#0-*i* (i=0, 1, 2, . . . , 255) notified from the firmware (Step SC-1).

The DMA RX of the encoder module #0 of the transmitting device 100-1 acquires the MPEG2-TS packet from the MUX (packet arranging unit 102*d*) (Step SC-2).

The DMA RX of the encoder module #0 of the transmitting device 100-1 determines whether the MPEG2-TS packet is the MPEG2-TS (SOF=1b) packet (Step SC-3).

When the DMA RX of the encoder module #0 of the transmitting device 100-1 determines that the MPEG2-TS packet is not the MPEG2-TS (SOF=1b) packet (No at Step SC-3), the processing is shifted to Step SC-11.

On the other hand, when the DMA RX of the encoder module #0 of the transmitting device 100-1 determines that the MPEG2-TS packet is the MPEG2-TS (SOF=1b) packet (Yes at Step SC-3), the processing is shifted to Step SC-4.

The DMA RX of the encoder module #0 of the transmitting device 100-1 determines whether the memory write counter is 0 (Step SC-4). Herein, the memory write counter is the number of MPEG2-TS packets which are written in the DMA buffer 106*a*.

When the DMA RX of the encoder module #0 of the transmitting device 100-1 determines that the memory write counter is not 0 (No at Step SC-4), the processing is shifted to Step SC-7.

On the other hand, when the DMA RX of the encoder module #0 of the transmitting device 100-1 determines that the memory write counter is 0 (Yes at Step SC-4), the processing is shifted to Step SC-5.

The DMA RX of the encoder module #0 of the transmitting device 100-1 writes the MPEG2-TS packet in the DMA buffer 106*a*#0-*i* (Step SC-5).

The DMA RX of the encoder module #0 of the transmitting device 100-1 increments the memory write counter by +1 (Step SC-6), and then the processing is shifted to Step SC-2.

On the other hand, the DMA RX of the encoder module #0 of the transmitting device 100-1 notifies the DMA completion of the DMA buffer 106*a*#0-*i* to the firmware (Step SC-7).

The DMA RX of the encoder module #0 of the transmitting device 100-1 increments the value of i by +1 (Step SC-8).

The DMA RX of the encoder module #0 of the transmitting device 100-1 acquires a head address and a buffer size of the following DMA buffer 106*a*#0-*i* notified from the firmware (Step SC-9).

The DMA RX of the encoder module #0 of the transmitting device 100-1 clears the memory write counter to 0 (Step SC-10) and then the processing is shifted to Step SC-3.

On the other hand, the DMA RX of the encoder module #0 of the transmitting device 100-1 determines whether the value of the [(memory write counter+1)×(MPEG2-TS packet size)] is smaller than the buffer size of the DMA buffer 106*a*#0-*i* (Step SC-11).

When the DMA RX of the encoder module #0 of the transmitting device 100-1 determines that the value of the [(memory write counter+1)×(MPEG2-TS packet size)] is not smaller than the buffer size of the DMA buffer 106*a*#0-*i* (No at Step SC-11), the processing is shifted to Step SC-14.

On the other hand, when the DMA RX of the encoder module #0 of the transmitting device 100-1 determines that the value of the [(memory write counter+1)×(MPEG2-TS packet size)] is smaller than the buffer size of the DMA buffer 106*a*#0-*i* (Yes at Step SC-11), the processing is shifted to Step SC-12.

The DMA RX of the encoder module #0 of the transmitting device 100-1 writes the MPEG2-TS packet in the DMA buffer 106*a*#0-*i* (Step SC-12).

The DMA RX of the encoder module #0 of the transmitting device 100-1 increments the memory write counter by +1 (Step SC-13), and then the processing is shifted to Step SC-2.

On the other hand, the DMA RX of the encoder module #0 of the transmitting device 100-1 notifies the DMA completion of the DMA buffer 106*a*#0-*i* to the firmware (Step SC-14).

The DMA RX of the encoder module #0 of the transmitting device 100-1 increments the value of i by +1 (Step SC-15).

The DMA RX of the encoder module #0 of the transmitting device 100-1 acquires a head address and a buffer size of the following DMA buffer 106*a*#0-*i* notified from the firmware (Step SC-16).

The DMA RX of the encoder module #0 of the transmitting device 100-1 clears the memory write counter to 0 (Step SC-17) and then the processing is shifted to Step SC-3.

In the embodiment, the DMA RX of the encoder module #1 may execute the same process by using the DMA buffer #1-*i* (i=0, 1, 2, . . . , 255).

An example of storage of the MPEG2-TS packet in the DMA buffer 106*a* according to the embodiment will be explained with reference to FIG. 8. FIG. 8 is a diagram of an example of storage of the MPEG2-TS packet in the DMA buffer 106*a* according to the embodiment.

Figure 8:
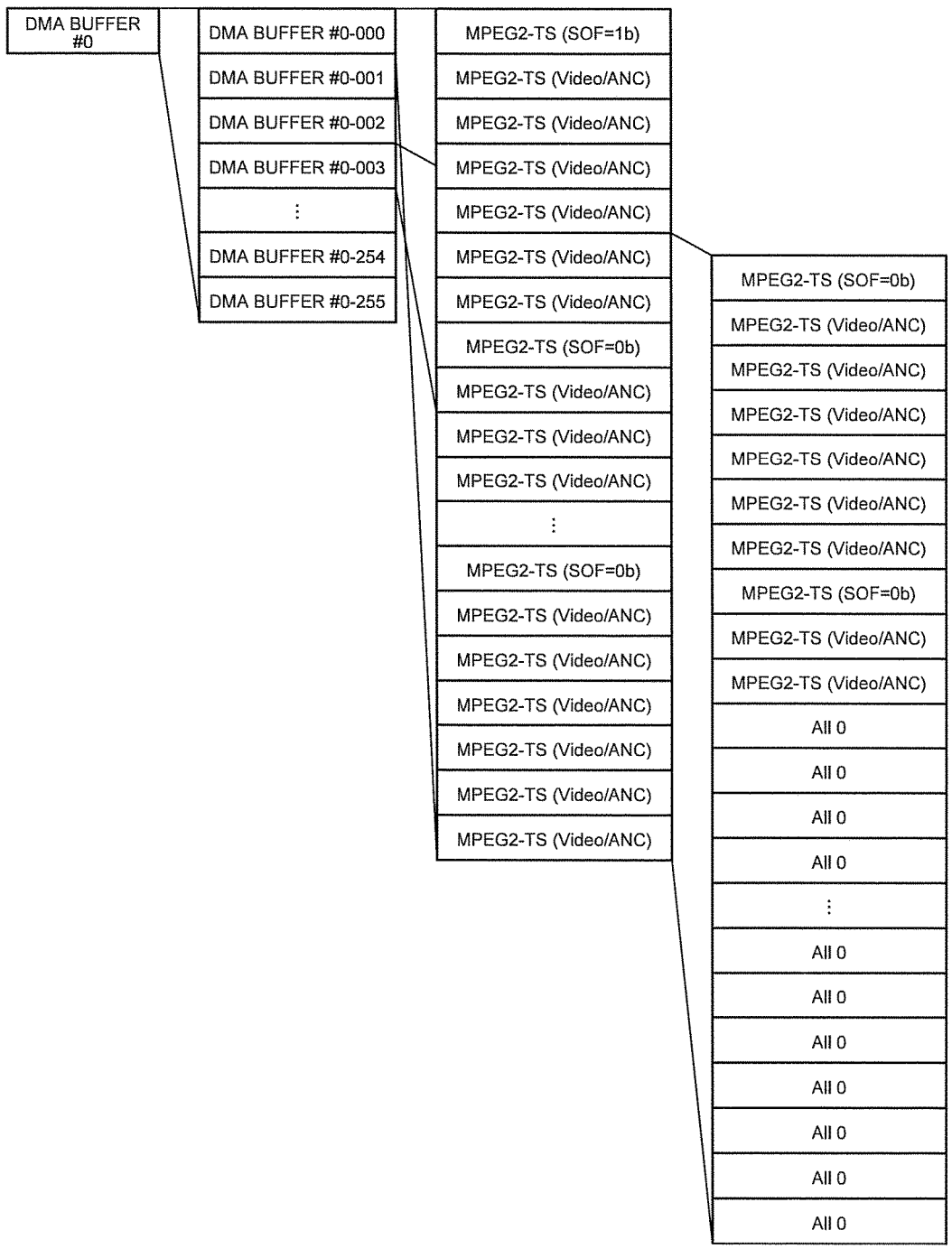
FIG. 8 is a diagram of an example of storage of the MPEG2-TS packet in a DMA buffer according to the embodiment.

As shown in FIG. 8, in the DMA by each module, data transmission and notification of completion to the firmware are performed every DMA buffer 106*a*#*x-xxx*. Herein, the size of the DMA buffer 106*a*#*x-xxx* may be controlled by the firmware.

As shown in FIG. 8, the size of the DMA buffer 106*a*#*x-xxx* may be the "size of the "MPEG2-TS packet"×7×"N (N=1, 2, 3, . . . )".

As shown in FIG. 8, the head of the DMA buffer 106*a*#*x-xxx* may be necessarily started from the MPEG2-TS (SOF=xb) packet. In addition, the interval indicated by the MPEG2-TS (SOF=xb) packet may be always constant from the head of the DMA buffer 106*a*#*x*.

As shown in FIG. 8, the MPEG2-TS (SOF=1b) packet may be necessarily stored in the head of the DMA buffer 106*a*#*x-xxx*. In addition, when opening the DMA buffer 106*a*#*x-xxx*, the firmware may set the entire areas of the DMA buffer 106*a*#*x-xxx* to "0".

In this manner, according to the embodiment, the arrangement interval of the individual data (MPEG2-TS (SOF=xb) packets) between the MPEG2-TS packets are allowed to be constant, so that the extraction of the MPEG2-TS (SOF=xb) packet from the DMA buffer 106a#x-xxx by the firmware is facilitated.

In the embodiment, the DMA from the module to the main memory is controlled every DMA buffer 106a having a size, and the data including the head of the video frame is controlled to be necessarily started from the head of the DMA buffer 106a.

In the embodiment, the individual data (MPEG2-TS (SOF=1b) packets) indicating the head of the video frame are arranged between the MPEG2-TS packets, and the MPEG2-TS (SOF=1b) packet is controlled to be necessarily stored in the head of the DMA buffer 106a#x-xxx of the main memory, so that the detection of the head of the video frame by the firmware is facilitated.

Returning to FIG. 3, the firmware of the transmitting device 100-1 copies the MPEG2-TS (camera A) packet of the DMA buffer #0 to the DMA buffer #2 and copies the MPEG2-TS (camera B) packet of the DMA buffer #1 to the DMA buffer #3 (Step SA-3).

An example of a process of the firmware according to the embodiment will be explained with reference to FIGS. 9 and 10.

First, an example of a process of the firmware on the DMA RX of the encoder module according to the embodiment will be explained with reference to FIG. 9. FIG. 9 is a flowchart of an example of a process in the video-processing apparatus 100 according to the embodiment.

Figure 9:
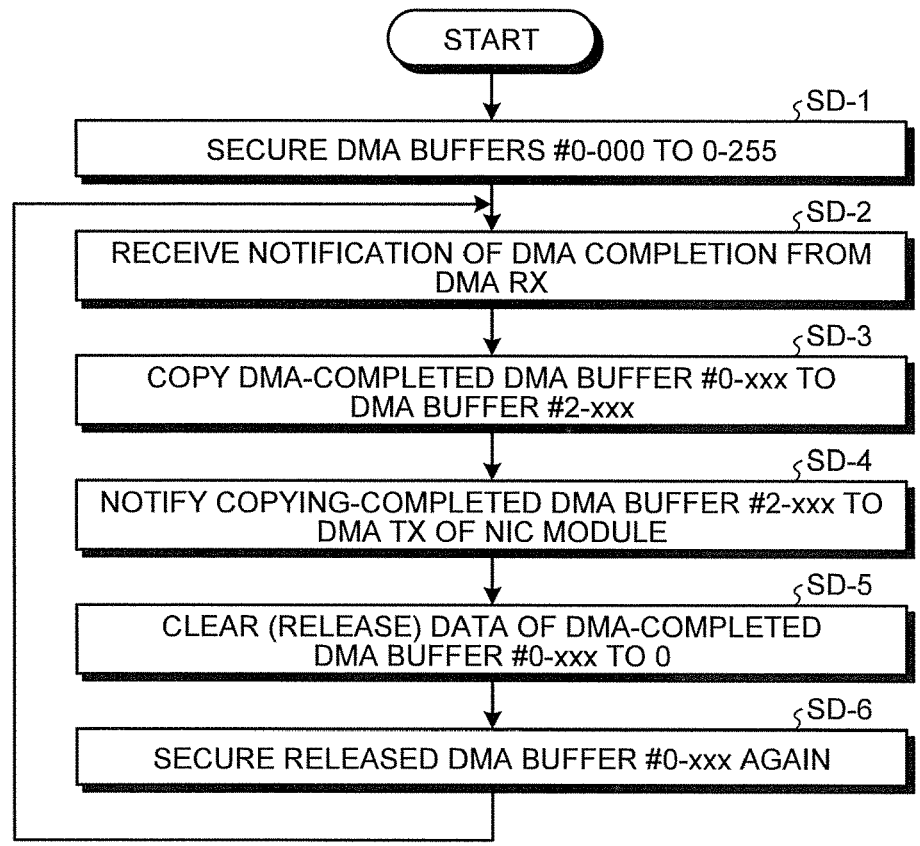
FIG. 9 is a flowchart of an example of a process of the video-processing apparatus according to the embodiment.

As shown in FIG. 9, first, the firmware (control unit 102) of the transmitting device 100-1 secures the DMA buffer 106a#0-000 to the DMA buffer 106a#0-255 (Step SD-1).

The firmware of the transmitting device 100-1 receives a notification of the DMA completion from the DMA RX (Step SD-2).

The firmware of the transmitting device 100-1 copies the data stored in the DMA buffer 106a#0-xxx of which DMA is completed to the DMA buffer 106a#2-xxx (Step SD-3).

The firmware of the transmitting device 100-1 notifies the data stored in the DMA buffer 106a#2-xxx of which copying is completed to the DMA TX of the NIC module (Step SD-4).

The firmware of the transmitting device 100-1 clears (releases) the data of the DMA buffer 106a#0-xxx of which DMA is completed to 0 (Step SD-5).

The firmware of the transmitting device 100-1 secures the released DMA buffer 106a#0-xxx again (Step SD-6) and then the processing is shifted to Step SD-2.

An example of a process of the firmware on the DMA TX of the NIC module according to the embodiment will be explained with reference to FIG. 10. FIG. 10 is a flowchart of an example of a process in the video-processing apparatus 100 according to the embodiment.

Figure 10:
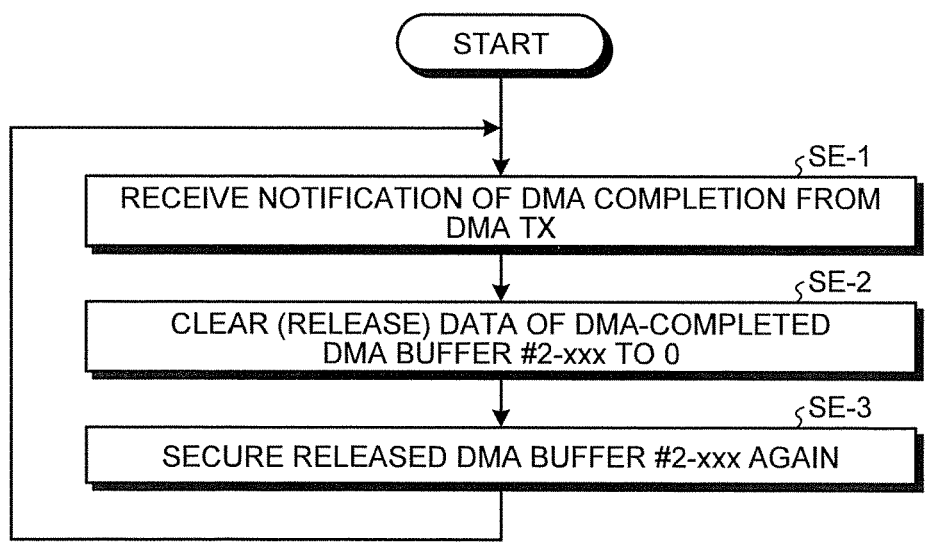
FIG. 10 is a flowchart of an example of a process of the video-processing apparatus according to the embodiment.

As shown in FIG. 10, first, the firmware (control unit 102) of the transmitting device 100-1 receives a notification of the DMA completion from the DMA TX (Step SE-1).

The firmware of the transmitting device 100-1 clears (releases) the data of the DMA buffer 106a#2-xxx of which DMA is completed to 0 (Step SE-2).

The firmware of the transmitting device 100-1 secures the released DMA buffer 106a#2-xxx again (Step SE-3) and then the processing is shifted to Step SE-1.

In the embodiment, the DMA TX#1 of the NIC module of the transmitting device 100-1 may execute the same process by using the DMA buffer 106a#3.

In the embodiment, the firmware of the receiving device 100-2 may execute the same process on the DMA TX#0 of the NIC module of the receiving device 100-2 or the DMA TX of the decoder module of the receiving device 100-2.

Returning to FIG. 3 the NIC module of the transmitting device 100-1 transmits the MPEG2-TS (camera A) packet of the DMA buffer #2 to the network 300 and transmits the MPEG2-TS (camera B) packet of the DMA buffer #3 to the network 300 (Step SA-4).

Figure 11:
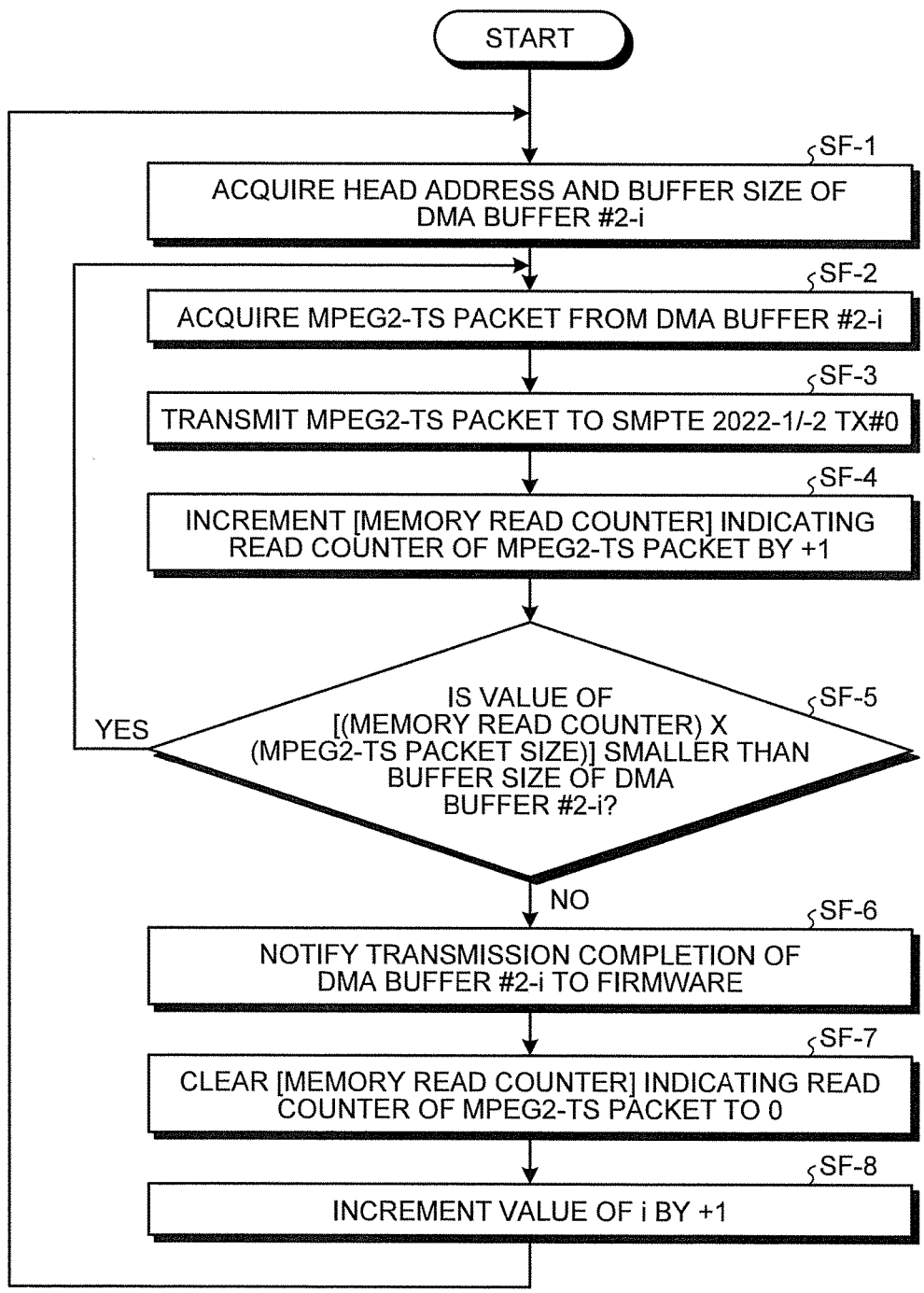
FIG. 11 is a flowchart of an example of a process of the video-processing apparatus according to the embodiment.

An example of a process of the DMA TX#0 of the NIC module according to the embodiment will be explained with reference to FIG. 11. FIG. 11 is a flowchart of an example of a process in the video-processing apparatus 100 according to the embodiment.

As shown in FIG. 11, first, the DMA TX#0 (packet reading unit 102f) of the NIC module of the transmitting device 100-1 acquires a head address and a buffer size of the DMA buffer 106a#2-i notified from the firmware (Step SF-1).

The DMA TX#0 of the NIC module of the transmitting device 100-1 acquires the MPEG2-TS packet from the DMA buffer 106a#2-i (Step SF-2).

The DMA TX#0 of the NIC module of the transmitting device 100-1 transmits the MPEG2-TS packet to the SMPTE 2022-1/-2 TX#0 (Step SF-3).

The DMA TX#0 of the NIC module of the transmitting device 100-1 increments the memory read counter indicating the read count of the MPEG2-TS packet by 1 (Step SF-4). Herein, the memory read counter may be the number of MPEG2-TS packets which are read from the DMA buffer 106a.

The DMA TX#0 of the NIC module of the transmitting device 100-1 determines whether the value of the [(memory read counter)×(MPEG2-TS packet size)] is smaller than the buffer size of the DMA buffer 106a#2-i (Step SF-5).

When the DMA TX#0 of the NIC module of the transmitting device 100-1 determines that the value of the [(memory read counter)×(MPEG2-TS packet size)] is smaller than the buffer size of the DMA buffer 106a#2-i (Yes at Step SF-5), the processing is shifted to Step SF-2.

On the other hand, when the DMA TX#0 of the NIC module of the transmitting device 100-1 determines that the value of the [(memory read counter)×(MPEG2-TS packet size)] is not smaller than the buffer size of the DMA buffer 106a#2-i (No at Step SF-5), the processing is shifted to Step SF-6.

The DMA TX#0 of the NIC module of the transmitting device 100-1 notifies the transmission completion of the DMA buffer 106a#2-i to the firmware (Step SF-6).

The DMA TX#0 of the NIC module of the transmitting device 100-1 clears the memory read counter indicating the read count of the MPEG2-TS packet to 0 (Step SF-7).

The DMA TX#0 of the NIC module of the transmitting device 100-1 increments the value of i by +1 (Step SF-8) and then the processing is shifted to Step SF-1.

In the embodiment, the DMA TX#1 of the NIC module of the transmitting device 100-1 may execute the same process by using the DMA buffer #3-i (i=0, 1, 2, . . . , 255) and the SMPTE 2022-1/-2 TX#1.

Returning to FIG. 3, the NIC module of the receiving device 100-2 receives the MPEG2-TS packet, allows the DMA RX#0 to process the MPEG2-TS packet of the camera A, transmits the MPEG2-TS packet to the DMA buffer #0 of the main memory; and the NIC module receives the MPEG2-TS packet, allows the DMA RX#1 to process the MPEG2-TS packet of the camera B, and transmits the MPEG2-TS packet to the DMA buffer #1 of the main memory (Step SA-5).

Figure 12:
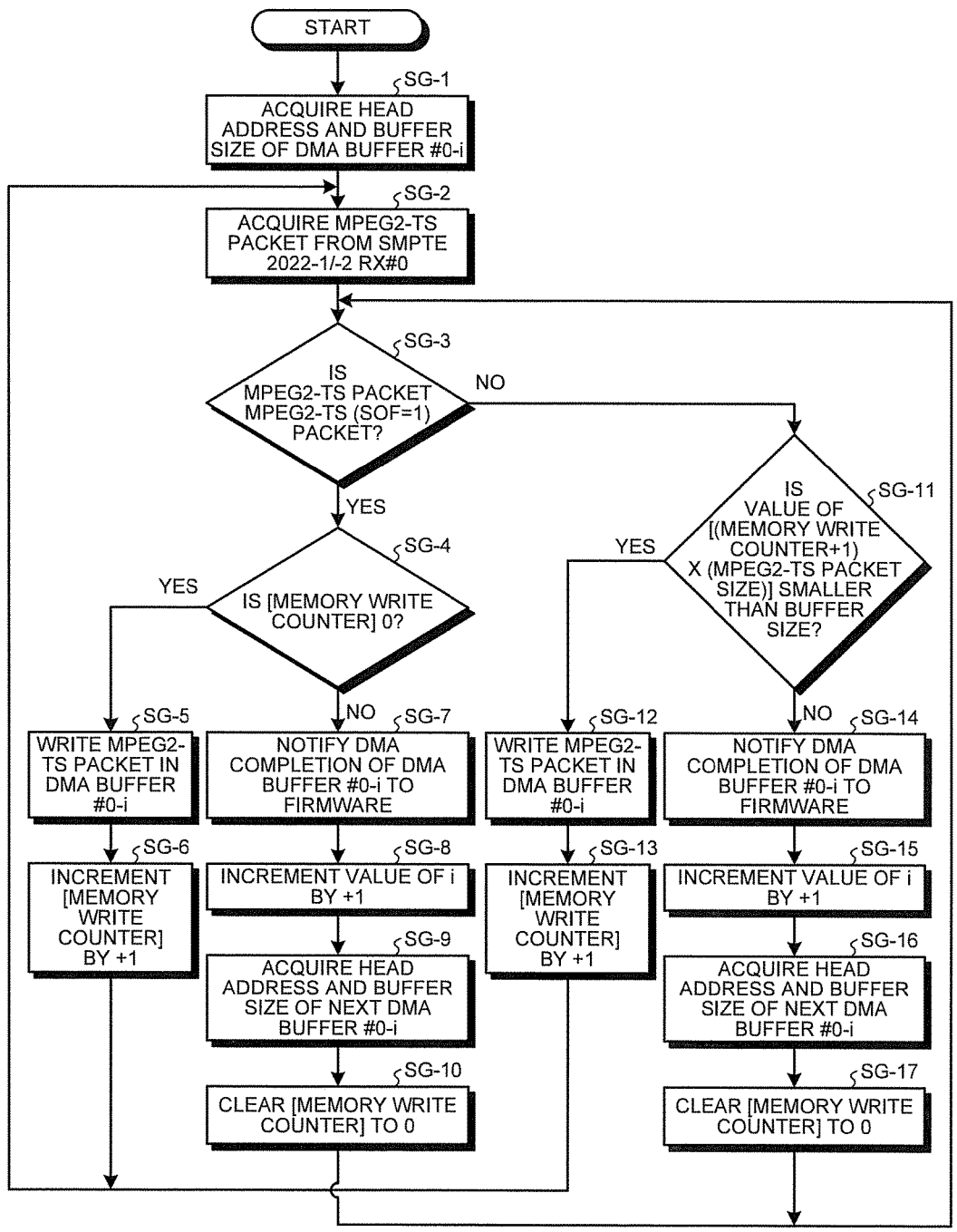
FIG. 12 is a flowchart of an example of a process of the video-processing apparatus according to the embodiment.

An example of a process of the DMA RX#0 of the NIC module according to the embodiment will be explained with reference to FIG. 12. FIG. 12 is a flowchart of an example of a process in the video-processing apparatus 100 according to the embodiment.

As shown in FIG. 12, first, the DMA RX#0 (packet writing unit 102e) of the NIC module of the receiving device 100-2 acquires a head address and a buffer size of the DMA buffer 106a#0-i notified from the firmware (Step SG-1).

The DMA RX#0 of the NIC module of the receiving device 100-2 acquires the MPEG2-TS packet from the SMPTE 2022-1/-2 RX#0 (Step SG-2).

The DMA RX#0 of the NIC module of the receiving device 100-2 determines whether the MPEG2-TS packet is the MPEG2-TS (SOF=1) packet (Step SG-3).

When the DMA RX#0 of the NIC module of the receiving device 100-2 determines that the MPEG2-TS packet is not the MPEG2-TS (SOF=1) packet (No at Step SG-3), the processing is shifted to Step SG-11.

On the other hand, when the DMA RX#0 of the NIC module of the receiving device 100-2 determines that the MPEG2-TS packet is the MPEG2-TS (SOF=1) packet (Yes at Step SG-3), the processing is shifted to Step SG-4.

The DMA RX#0 of the NIC module of the receiving device 100-2 determines whether the memory write counter is 0 (Step SG-4).

When the DMA RX#0 of the NIC module of the receiving device 100-2 determines that the memory write counter is not 0 (No at Step SG-4), the processing is shifted to Step SG-7.

On the other hand, when the DMA RX#0 of the NIC module of the receiving device 100-2 determines that the memory write counter is 0 (Yes at Step SG-4), the processing is shifted to Step SG-5.

The DMA RX#0 of the NIC module of the receiving device 100-2 writes the MPEG2-TS packet in the DMA buffer 106a#0-i (Step SG-5).

The DMA RX#0 of the NIC module of the receiving device 100-2 increments the memory write counter by +1 (Step SG-6) and then the processing is shifted to Step SG-2.

On the other hand, the DMA RX#0 of the NIC module of the receiving device 100-2 notifies the DMA completion of the DMA buffer 106a#0-i to the firmware (Step SG-7).

The DMA RX#0 of the NIC module of the receiving device 100-2 increments the value of i by +1 (Step SG-8).

The DMA RX#0 of the NIC module of the receiving device 100-2 acquires a head address and a buffer size of the following DMA buffer 106a#0-i notified from the firmware (Step SG-9).

The DMA RX#0 of the NIC module of the receiving device 100-2 clears the memory write counter to 0 (Step SG-10) and then the processing is shifted to Step SG-3.

On the other hand, the DMA RX#0 of the NIC module of the receiving device 100-2 determines whether the value of the [(memory write counter+1)×(MPEG2-TS packet size)] is smaller than the buffer size of the DMA buffer 106a#0-i (Step SG-11).

When the DMA RX#0 of the NIC module of the receiving device 100-2 determines that the value of the [(memory write counter+1)×(MPEG2-TS packet size)] is not smaller than the buffer size of the DMA buffer 106a#0-i (No at Step SG-11), the processing is shifted to Step SG-14.

On the other hand, when the DMA RX#0 of the NIC module of the receiving device 100-2 determines that the value of the [(memory write counter+1)×(MPEG2-TS packet size)] is smaller than the buffer size of the DMA buffer 106a#0-i (Yes at Step SG-11), the processing is shifted to Step SG-12.

The DMA RX#0 of the NIC module of the receiving device 100-2 writes the MPEG2-TS packet in the DMA buffer 106a#0-i (Step SG-12).

The DMA RX#0 of the NIC module of the receiving device 100-2 increments the memory write counter by +1 (Step SG-13), and then the processing is shifted to Step SG-2.

On the other hand, the DMA RX#0 of the NIC module of the receiving device 100-2 notifies the DMA completion of the DMA buffer 106a#0-i to the firmware (Step SG-14).

The DMA RX#0 of the NIC module of the receiving device 100-2 increments the value of i by +1 (Step SG-15).

The DMA RX#0 of the NIC module of the receiving device 100-2 acquires a head address and a buffer size of the following DMA buffer 106a#0-i notified from the firmware (Step SG-16).

The DMA RX#0 of the NIC module of the receiving device 100-2 clears the memory write counter to 0 (Step SG-17) and then the processing is shifted to Step SG-3.

In the embodiment, the DMA RX#1 of the NIC module of the receiving device 100-2 may execute the same process by using the DMA buffer #1-i (i=0, 1, 2, . . . , 255).

Returning to FIG. 3, the firmware of the receiving device 100-2 copies the MPEG2-TS (camera A) packet of the DMA buffer #0 to the DMA buffer #2 (Step SA-6).

An example of a process of the firmware according to the embodiment will be explained with reference to FIGS. 13 to 15.

An example of a firmware process on the DMA RX#0 of the NIC module according to the embodiment will be explained with reference to FIGS. 13 and 14. FIGS. 13 and 14 are flowcharts of an example of a process in the video-processing apparatus 100 according to the embodiment.

Figure 13:
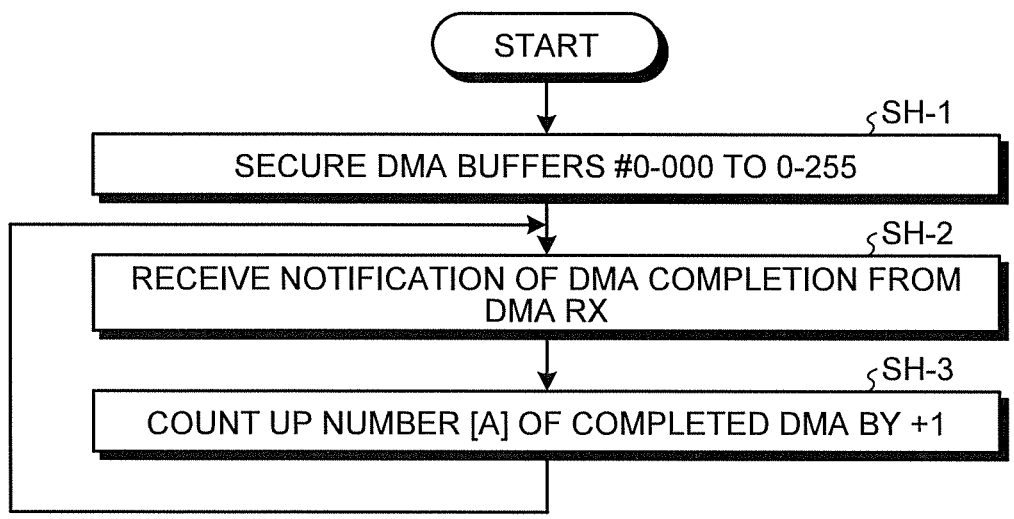
FIG. 13 is a flowchart of an example of a process of the video-processing apparatus according to the embodiment.

As shown in FIG. 13, first, the firmware (control unit 102) of the receiving device 100-2 secures DMA buffer 106a#0-000 to DMA buffer 106a#0-255 (Step SH-1).

The firmware of the receiving device 100-2 receives a notification of the DMA completion from the DMA RX (Step SH-2).

The firmware of the receiving device 100-2 counts up the value of the number [A] of completed DMAs by +1 (Step SH-3) and then the processing is shifted to Step SH-2.

[A] may be the number of DMAs of which the data transmission by the DMA RX is completed and of which processing by the firmware is not completed.

In the embodiment, in the case of a process with respect to the DMA RX#1, the firmware of the receiving device 100-2 may execute the same process by the DMA buffer #1-i (i=0, 1, 2, . . . , 255).

Figure 14:
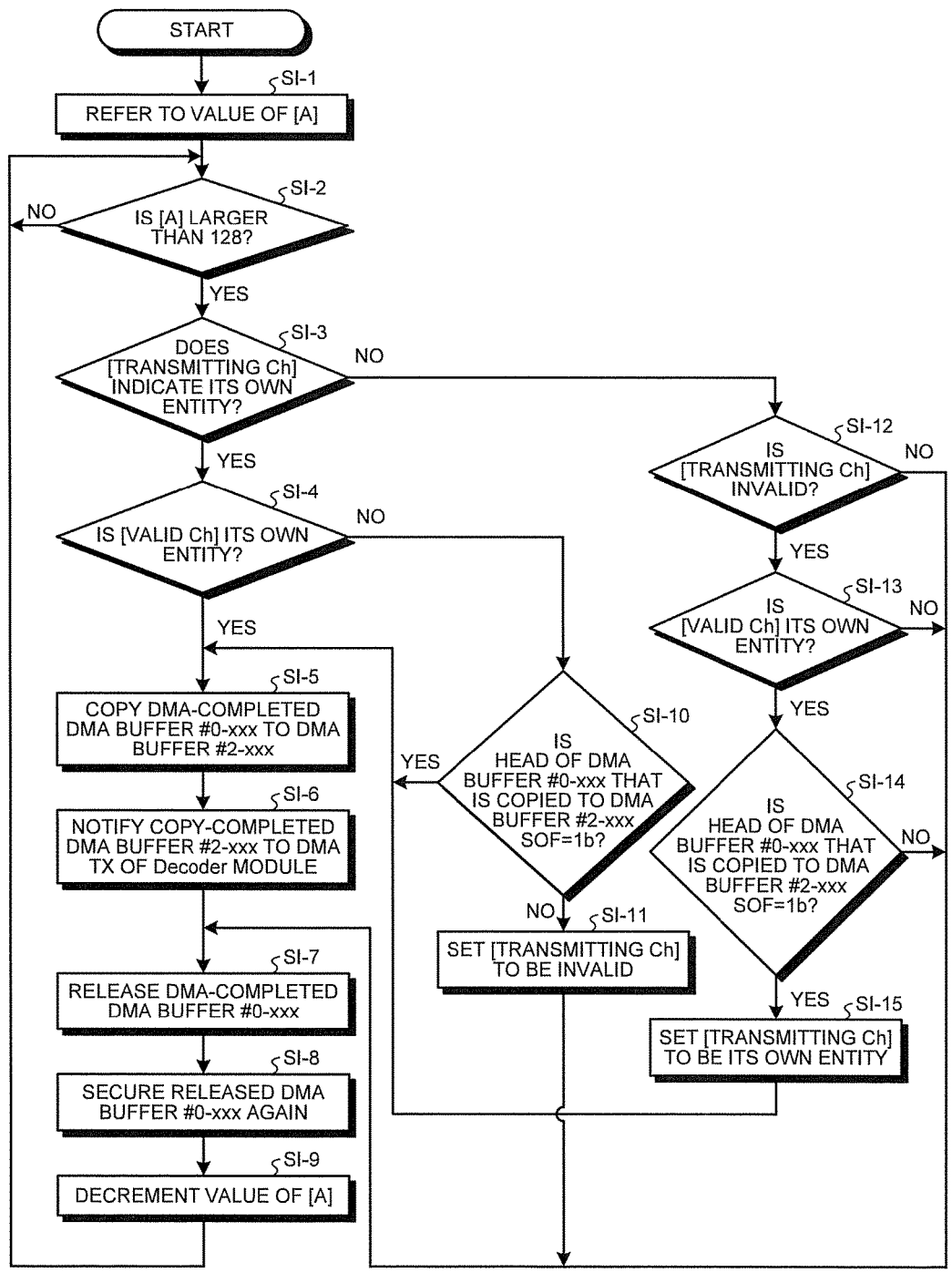
FIG. 14 is a flowchart of an example of a process of the video-processing apparatus according to the embodiment.

As shown in FIG. 14, first, the firmware (control unit 102) of the receiving device 100-2 refers to a value of [A] (Step SI-1).

The firmware of the receiving device 100-2 determines whether the value of the [A] is larger than 128 (Step SI-2).

When the firmware of the receiving device 100-2 determines that the value of the [A] is smaller than 128 (No at Step SI-2), the processing is repeated (after standby) (the processing is shifted to Step SI-2).

On the other hand, when the firmware of the receiving device 100-2 determines that the value of the [A] is larger than 128 (Yes at Step SI-2), the processing is shifted to Step SI-3.

The firmware of the receiving device 100-2 determines whether the transmitting Ch indicates its own entity (Step SI-3). Herein, the transmitting Ch may indicate the number (#x) of the DMA RX of the NIC module which is currently transmitting data to the decoder module.

When the DMAs RX#x of all the NIC modules do not transmit the data to the decoder module, the transmitting Ch may be indicated by "invalid".

When the firmware of the receiving device 100-2 determines that the transmitting Ch does not indicate its own entity (No at Step SI-3), the processing is shifted to Step SI-12.

On the other hand, when the firmware of the receiving device 100-2 determines that the transmitting Ch indicates its own entity (Yes at Step SI-3), the processing is shifted to Step SI-4.

The firmware of the receiving device 100-2 determines whether the valid Ch is its own entity (Step SI-4). Herein, the valid Ch may indicate the number (#x) of the DMA RX of the NIC module which is currently valid (object which transmits data to the decoder module).

When the firmware of the receiving device 100-2 determines that the valid Ch is not its own entity (No at Step SI-4), the processing is shifted to Step SI-10.

On the other hand, when the firmware of the receiving device 100-2 determines that the valid Ch is its own entity (Yes at Step SI-4), the processing is shifted to Step SI-5.

The firmware of the receiving device 100-2 copies the DMA buffer 106*a*#0-*xxx* of which DMA is completed to the DMA buffer 106*a*#2-*xxx* (Step SI-5).

The firmware of the receiving device 100-2 notifies the DMA buffer 106*a*#2-*xxx* of which copying is completed to the DMA TX of the decoder module (Step SI-6).

The firmware of the receiving device 100-2 releases the DMA buffer 106*a*#0-*xxx* of which DMA is completed (Step SI-7).

The firmware of the receiving device 100-2 secures the released DMA buffer 106*a*#0-*xxx* again (Step SI-8).

The firmware of the receiving device 100-2 decrements the value of the [A] (Step SI-9) and then the processing is shifted to Step SI-2.

On the other hand, the firmware of the receiving device 100-2 determines whether the head of the DMA buffer 106*a*#0-*xxx* which is copied to the DMA buffer 106*a*#2-*xxx* is the MPEG2-TS (SOF=1b) packet (Step SI-10).

When the firmware of the receiving device 100-2 determines that the head of the DMA buffer 106*a*#0-*xxx* which is copied to the DMA buffer 106*a*#2-*xxx* is the MPEG2-TS (SOF=1b) packet (Yes at Step SI-10), the processing is shifted to Step SI-5.

On the other hand, when the firmware of the receiving device 100-2 determines that the head of the DMA buffer 106*a*#0-*xxx* which is copied to the DMA buffer 106*a*#2-*xxx* is not the MPEG2-TS (SOF=1b) packet (No at Step SI-10), the processing is shifted to Step SI-11.

The firmware of the receiving device 100-2 sets the transmitting Ch to be invalid (Step SI-11) and then the processing is shifted to Step SI-7.

On the other hand, the firmware of the receiving device 100-2 determines whether the transmitting Ch is invalid (Step SI-12).

When the firmware of the receiving device 100-2 determines that the transmitting Ch is not invalid (No at Step SI-12), the processing is shifted to Step SI-7.

On the other hand, when the firmware of the receiving device 100-2 determines that the transmitting Ch is invalid (Yes at Step SI-12), the processing is shifted to Step SI-13.

The firmware of the receiving device 100-2 determines whether the valid Ch is its own entity (Step SI-13).

When the firmware of the receiving device 100-2 determines that the valid Ch is not its own entity (No at Step SI-13), the processing is shifted to Step SI-7.

On the other hand, when the firmware of the receiving device 100-2 determines that the valid Ch is its own entity (Yes at Step SI-13), the processing is shifted to Step SI-14.

The firmware of the receiving device 100-2 determines whether the head of the DMA buffer 106*a*#0-*xxx* which is copied to the DMA buffer 106*a*#2-*xxx* is the MPEG2-TS (SOF=1b) packet (Step SI-14).

When the firmware of the receiving device 100-2 determines that the head of the DMA buffer 106*a*#0-*xxx* which is copied to the DMA buffer 106*a*#2-*xxx* is not the MPEG2-TS (SOF=1b) packet (No at Step SI-14), the processing is shifted to Step SI-7.

On the other hand, when the firmware of the receiving device 100-2 determines that the head of the DMA buffer 106*a*#0-*xxx* which is copied to the DMA buffer 106*a*#2-*xxx* is the MPEG2-TS (SOF=1b) packet (Yes at Step SI-14), the processing is shifted to Step SI-15.

The firmware of the receiving device 100-2 sets the transmitting Ch to be its own entity (Step SI-15) and then the processing is shifted to Step SI-5.

In the embodiment, the DMA RX#1 of the NIC module of the receiving device 100-2 may execute the same process by using the DMA buffer 106*a*#1-*xxx*.

An example of an acceptance process of the firmware with respect to a channel switch instruction from a user according to the embodiment will be explained with reference to FIG. 15. FIG. 15 is a flowchart of an example of a process in the video-processing apparatus 100 according to the embodiment.

Figure 15:
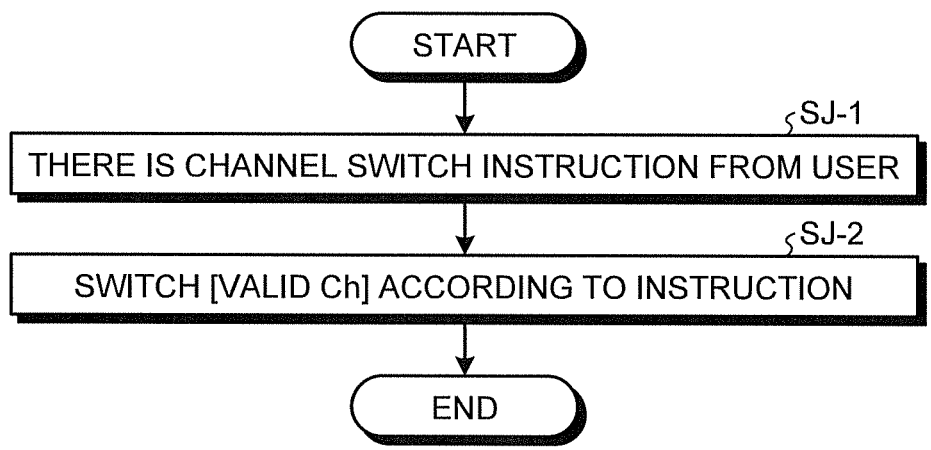
FIG. 15 is a flowchart of an example of a process of the video-processing apparatus according to the embodiment.

As shown in FIG. 15, first, when there is a channel switch instruction from a user, the firmware (control unit 102) of the receiving device 100-2 receives the channel switch instruction (Step SJ-1).

The firmware of the receiving device 100-2 switches the valid Ch according to the channel switch instruction (Step SJ-2) and then the processing is ended.

Returning to FIG. 3, the decoder module of the receiving device 100-2 acquires the MPEG2-TS (camera A) packet of the DMA buffer #2, converts the MPEG2-TS (camera A) packet into the video/ANC data, outputs the video/ANC data to the display (Step SA-7), and then the processing is ended.

Figure 16:
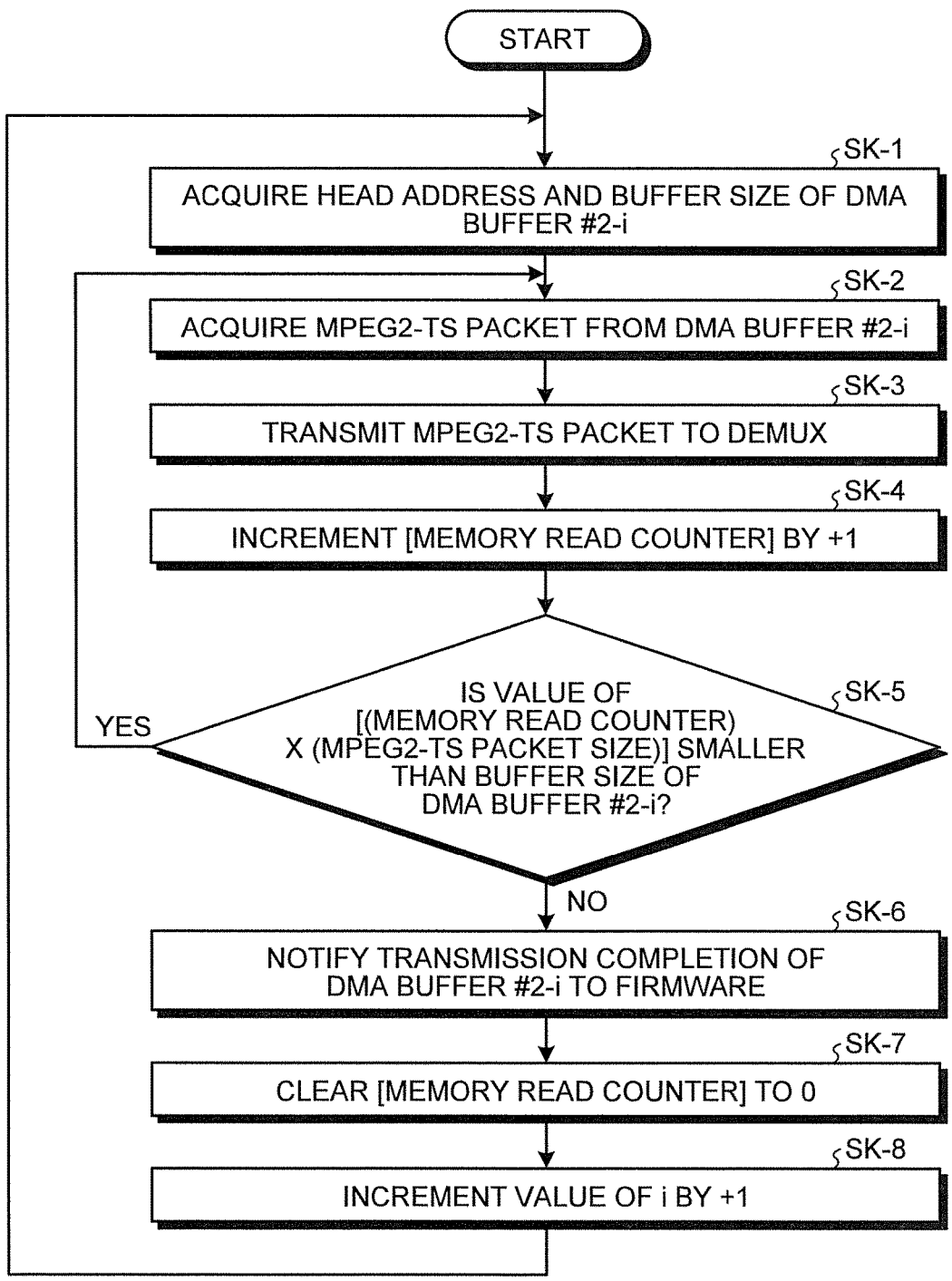
FIG. 16 is a flowchart of an example of a process of the video-processing apparatus according to the embodiment.

An example of a process of the DMA TX of the decoder module of the receiving device 100-2 according to the embodiment will be explained with reference to FIG. 16. FIG. 16 is a flowchart of an example of a process in the video-processing apparatus 100 according to the embodiment.

As shown in FIG. 16, first, the DMA TX (packet reading unit 102*f*) of the decoder module of the receiving device 100-2 acquires a head address and a buffer size of the DMA buffer 106*a*#2-*i* notified from the firmware (Step SK-1).

The DMA TX of the decoder module of the receiving device 100-2 acquires the MPEG2-TS packet from the DMA buffer 106*a*#2-*i* (Step SK-2).

The DMA TX of the decoder module of the receiving device 100-2 transmits the MPEG2-TS packet to the DEMUX (Step SK-3).

The DMA TX of the decoder module of the receiving device 100-2 increments the memory read counter of the MPEG2-TS packet by +1 (Step SK-4).

The DMA TX of the decoder module of the receiving device 100-2 determines whether the value of the [(memory read counter)×(MPEG2-TS packet size)] is smaller than the buffer size of the DMA buffer 106a#2-i (Step SK-5).

When the DMA TX of the decoder module of the receiving device 100-2 determines that the value of the [(memory read counter)×(MPEG2-TS packet size)] is smaller than the buffer size of the DMA buffer 106a#2-i (Yes at Step SK-5), the processing is shifted to Step SK-2.

On the other hand, when the DMA TX of the decoder module of the receiving device 100-2 determines that the value of the [(memory read counter)×(MPEG2-TS packet size)] is not smaller than the buffer size of the DMA buffer 106a#2-i (No at Step SK-5), the processing is shifted to Step SK-6.

The DMA TX of the decoder module of the receiving device 100-2 notifies the transmission completion of the DMA buffer 106a#2-i to the firmware (Step SK-6).

The DMA TX of the decoder module of the receiving device 100-2 clears the memory read counter of the MPEG2-TS packet to 0 (Step SK-7).

The DMA TX of the decoder module of the receiving device 100-2 increments the value of i by +1 (Step SK-8), and then the processing is shifted to Step SK-1.

When the switching of the video channel (switching from the camera A to the camera B) which is output to the display occurs in the receiving device 100-2, the firmware of the receiving device 100-2 extracts the MPEG2-TS (SOF=1b) packet from the DMA buffer #0 and the DMA buffer #1.

After that, at the timing of copying the MPEG2-TS (SOF=1b) packet of the DMA buffer #0 to the DMA buffer #2, the firmware of the receiving device 100-2 copies the MPEG2-TS (SOF=1b) packet of the DMA buffer #1 to the DMA buffer #2.

After that, the firmware of the receiving device 100-2 copies the MPEG2-TS (camera B) packet of the DMA buffer #1 to the DMA buffer #2.

Therefore, by the decoder module of the receiving device 100-2, the video/ANC data output to the display are switched from the camera A to the camera B.

Since the firmware of the receiving device 100-2 switches the video/ANC data in units of a video frame, in a display, disturbance of a video does not occur (video/ANC data of the camera A and video/ANC data of the camera B are not included in the same frame).

Conventionally, when a plurality of video channels are received via the network 300 and output to the display or the like, when a user selects and switches the video channel, it is demanded that the video displayed on the display or the like is not to be disturbed.

The disturbance of the video is, for example, occurrence of mixing of the data of other video channel in the same video frame.

The embodiment provides a technique capable of receiving and transmitting two or more video channels via the network 300 and switching the video channel which is to be output to the display or the like without disturbance of the video.

The device according to the embodiment has a configuration where a video data (compressed data) receiver and a video data (compressed data) decoding unit are separated as modules, and the modules are interconnected by using a PCIe fabric, a main memory, and a CPU or the like where a firmware operate.

In the embodiment, the identification data which identifies the head of the frame are designed to be buried in the compressed video data, and the compressed video data are designed to be exchanged between the modules, so that smooth switching of the video channel is implemented.

In the embodiment, by replacement of the module, various configurations of the device can be implemented.

In the embodiment, the insert interval of the individual data (MPEG2-TS (SOF=xb) packet) into the MPEG2-TS packet is controlled to be set to be constant, and the number of MPEG2-TS packets included in the frame output on the network 300 is controlled to be the same as the interval.

Therefore, according to the embodiment, one piece of the individual data is necessarily included in the entire frames, and thus, even though frame loss occurs, information and instruction from a device receiving the video/ANC data from a camera or the like to a device outputting the video/ANC data can be transmitted without omission irrespective of a quality of the network 300.

Other Embodiments

The embodiment of the present disclosure has been explained so far. Besides the foregoing embodiment, the present disclosure can also be carried out in various different embodiments within the scope of the technical idea described in the claims.

For example, the video-processing apparatus 100 may perform processing in a standalone mode, or may perform processing according to a request from a client terminal (separate from the video-processing apparatus 100) and then return the results of the processing to the client terminal.

Out of the processes explained in relation to the embodiment, all or some of the processes explained as being automatically performed may be manually performed, or all or some of the processes explained as being manually performed may be automatically performed by publicly known methods.

Besides, the process steps, the control steps, the specific names, the information including registered data for the processes or parameters such as search conditions, the screen examples, or the database configurations described or illustrated herein or the drawings can be arbitrarily changed if not otherwise specified.

The constituent elements of the video-processing apparatus 100 shown in the drawings are conceptual functions and do not necessarily need to be physically configured as shown in the drawings.

For example, all or any part of the processing functions included in the units of the video-processing apparatus 100, in particular, the processing functions performed by the control unit 102 may be implemented by the CPU or programs interpreted and executed by the CPU, or may be implemented by wired logic-based hardware.

The programs including programmed instructions for causing a computer to execute methods according to the present disclosure described later are recorded in non-transitory computer-readable recording media, and are mechanically read by the video-processing apparatus 100 as necessary. Specifically, the computer programs for giving instructions to the CPU to perform various processes in cooperation with an operating system (OS) are recorded in the storage unit 106 such as a ROM or an HDD. The computer programs are loaded into the RAM and executed, and constitute a control unit in cooperation with the CPU.

The computer programs may be stored in an application program server connected to the video-processing apparatus 100 via an arbitrary network, and may be entirely or partly downloaded as necessary.

The programs according to the present disclosure may be stored in computer-readable recording media or may be formed as program products. The "recording media" include any portable physical media such as a memory card, a USB memory, an SD card, a flexible disc, a magneto optical disc, a ROM, an EPROM, an EEPROM, a CD-ROM, an MO, a DVD, and a Blu-ray (registered trademark) DVD.

The "programs" constitute data processing methods described in an arbitrary language or by an arbitrary describing method, and are not limited in format such as source code or binary code. The "programs" are not limited to singly-configured ones but may be distributed into a plurality of modules or libraries or may perform their functions in conjunction with another program typified by an OS. Specific configurations for reading the recording media by the units according to the embodiment, specific procedures for reading the programs, or specific procedures for installing the read programs may be well-known configurations or procedures.

The various databases and others stored in the storage unit 106 may be storage units such as any one, some, or all of a memory device such as a RAM or a ROM, a fixed disc device such as a hard disc, a flexible disc, and an optical disc, and may store any one, some, or all of various programs, tables, databases, and web page files for use in various processes and web site provision.

The video-processing apparatus 100 may be an information processing apparatus such as a well-known personal computer or work station, and arbitrary peripherals may be connected to the information processing apparatus. The video-processing apparatus 100 may be embodied by providing the information processing apparatus with software (including programs, data, and the like) for implementing the methods according to the present disclosure.

Further, the specific modes of distribution and integration of the devices are not limited to the ones illustrated in the drawings but all or some of the devices may be functionally or physically distributed or integrated by arbitrary unit according to various additions and the like or functional loads. That is, the foregoing embodiments may be carried out in arbitrary combination or may be selectively carried out.

In the present disclosure, data corresponding to a head of a video frame can be detected at a high speed by arranging an individual identification data packet according to a general standard.

According to the present disclosure, since the individual identification data are according to a general standard, mutual compatibility between apparatuses of different types of venders can be maintained. In addition, according to the present disclosure, with respect to a video channel which is not output to a display, there is no need to perform de-encapsulation on the individual identification data packet.

According to the present disclosure, since the head of the video frame can be detected at a high speed, the video channel can be smoothly switched. Therefore, according to the present disclosure, two or more video channels can be received or transmitted via a network, and the video channel output to the display or the like can be switched without disturbance of the video.

According to the present disclosure, video data constituting information (the number of pixels, a frame rate, and the like), operation instructions, and the like can be securely transmitted from an apparatus receiving video/ANC data from a camera or the like to an apparatus outputting video/ancillary (ANC) data to a display or the like irrespective of a quality of the network.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A video-processing apparatus comprising:
a memory: and
a processor coupled to the memory, wherein
the processor executes a process comprising:
receiving, via a network, a network frame including a video data packet, an ancillary data packet, and an identification data packet, the identification data packet indicating whether the video data packet includes data of a head of a video frame and the identification data packet being arranged by a predetermined period from a head of the network frame;
writing the identification data packet in a first buffer, and writing the video data packet and the ancillary data packet in a second buffer;
clearing the first buffer after reading the identification data packet from the first buffer and reading the video data packet and the ancillary data packet from the second buffer;
converting the video data packet into video data and converting the ancillary data packet into ancillary data; and
multiplexing the video data and the ancillary data to output video/ancillary data.

2. The video-processing apparatus according to claim 1, wherein the writing includes writing the identification data packet indicating the head of the video frame in the first buffer.

3. The video-processing apparatus according to claim 1, wherein the identification data packet includes a payload ID that is different from those of the video data and the ancillary data.

4. The video-processing apparatus according to claim 1, wherein the identification data packet includes a header and frame start data indicating as to whether to be a head of the video frame.

5. The video-processing apparatus according to claim 1, wherein the predetermined period is an interval equal to a sum of the number of video data packets and the number of ancillary data packets included in the network frame.

6. The video-processing apparatus according to claim 1, wherein the process further comprises discarding the identification data packet.

7. A video-processing apparatus comprising:
a memory; and
a processor coupled to the memory, wherein
the processor executes a process comprising;
acquiring video/ancillary data from a photographing device and separating the video/ancillary data into video data and ancillary data;
packetizing the video data into a video data packet and packetizing the ancillary data into an ancillary data packet;
arranging an identification data packet from a head of a network frame by a predetermined period and arranging the video data packet and the ancillary data packet, the identification data packet indicating whether the video data packet includes data of a head frame of a video frame;
writing the identification data packet in a first buffer, and writing the video data packet and the ancillary data packet in a second buffer;

clearing the first buffer after reading the identification data packet from the first buffer, and reading the video data packet, and the ancillary data packet from the second buffer; and transmitting the network frame where the identification data packet is arranged by the predetermined period from the head of the network frame and that includes the video data packet and the ancillary data packet via the network.

8. The video-processing apparatus according to claim 7, wherein the writing includes writing the identification data packet indicating the head of the video frame, in the first buffer.

9. A video-processing system comprising:
a transmitting device and a receiving device that are communicably connected,
wherein the transmitting device includes:
a first memory; and
a first processor coupled to the first memory, wherein the first processor executes a first process comprising:
acquiring video/ancillary data from a photographing device and separating the video/ancillary data into video data and ancillary data;
packetizing the video data into a video data packet and packetizing the ancillary data into an ancillary data packet;
arranging an identification data packet from a head of a network frame by a predetermined period and arranging the video data packet and the ancillary data packet, the identification data packet indicating whether the video data packet includes data of a head of a video frame;
writing the identification data packet in a first buffer of a transmission side, and writing the video data packet and the ancillary data packet in a second buffer of the transmission side;
clearing the first buffer of the transmission side after reading the identification data packet from the first buffer of the transmission side, and reading the video data packet and the ancillary data packet from the second buffer of the transmission side; and
transmitting the network frame where the identification data packet is arranged by the predetermined period from the head of the network frame and that includes the video data packet and the ancillary data packet via the network, and
wherein the receiving device includes:
a second memory; and
a second processor coupled to the second memory, wherein
the second processor executes a second process comprising:
receiving the network frame via the network;
writing the identification data packet in a third buffer of a reception side, and writing the video data packet and the ancillary data packet in a fourth buffer of the reception side;
clearing the third buffer of the reception side after reading the identification data packet from the third buffer of the reception side, and reading the video data packet and the ancillary data packet from the fourth buffer of the reception side;
converting the video data packet into the video data and converting the ancillary data packet into the ancillary data; and
multiplexing the video data and the ancillary data to output the video/ancillary data.

10. A video-processing method comprising:
receiving, via a network, a network frame including a video data packet, an ancillary data packet and an identification data packet, the identification data packet indicating whether the video data packet includes data of a head of a video frame and the identification data packet being arranged by a predetermined period from a head of the network frame;
writing the identification data packet in a first buffer, and writing the video data packet and the ancillary data packet in a second buffer;
clearing the first buffer after reading the identification data packet from the first buffer, and reading the video data packet and the ancillary data packet from the second buffer;
converting the video data packet into video data and converting the ancillary data packet into ancillary data; and
multiplexing the video data and the ancillary data to output video/ancillary data.

11. The video-processing method according to claim 10, wherein at the writing, the identification data packet indicating the head of the video frame is written in the first buffer.

12. The video-processing method according to claim 10, wherein the identification data packet includes a payload ID that is different from those of the video data and the ancillary data.

13. A video-processing method comprising:
acquiring video/ancillary data from a photographing device and separating the video/ancillary data into video data and ancillary data;
packetizing the video data into a video data packet and packetizing the ancillary data into an ancillary data packet;
arranging an identification data packet from a head of a network frame by a predetermined period and arranging the video data packet and the ancillary data packet, the identification data packet indicating whether the video data packet includes data of a head of a video frame;
writing the identification data packet in a first buffer, and writing the video data packet and the ancillary data packet in a second buffer;
clearing the first buffer after reading the identification data packet from the first buffer, and reading the video data packet and the ancillary data packet from the second buffer; and
transmitting the network frame where the identification data packet is arranged by the predetermined period from the head of the network frame and that includes the video data packet and the ancillary data packet via the network.

14. A video-processing method executed in a video-processing system including a transmitting device and a receiving device that are communicably connected,
the video-processing method comprising:
acquiring video/ancillary data from a photographing device and separating the video/ancillary data into video data and ancillary data, as executed in the transmitting device;
packetizing the video data into a video data packet and packetizing the ancillary data into an ancillary data packet, as executed in the transmitting device;
arranging an identification data packet from a head of a network frame by a predetermined period and arranging the video data packet and the ancillary data packet, as executed in the transmitting device, the identification data packet indicating whether the video data packet includes data of a head of a video frame;

writing the identification data packet in a first buffer of a transmission side, and writing the video data packet and the ancillary data packet in a second buffer of the transmission side, as executed in the transmitting device;

clearing the first buffer of the transmission side after reading the identification data packet from the first buffer of the transmission side, and reading the video data packet and the ancillary data packet from the second buffer of the transmission side, as executed in the transmitting device;

transmitting the network frame where the identification data packet is arranged by the predetermined period from the head of the network frame and that includes the video data packet and the ancillary data packet via the network, as executed in the transmitting device;

receiving the network frame via the network, as executed in the receiving device;

writing the identification data packet in a third buffer of a reception side, and writing the video data packet and the ancillary data packet in a fourth buffer of the reception side, as executed in the receiving device;

clearing the third buffer of the reception side after reading the identification data packet from the third buffer of the reception side, and reading the video data packet and the ancillary data packet from the fourth buffer of the reception side, as executed in the receiving device;

converting the video data packet into the video data and converting the ancillary data packet into the ancillary data, as executed in the receiving device; and multiplexing the video data and the ancillary data to output the video/ancillary data, as executed in the receiving device.

* * * * *